US006906318B2

(12) United States Patent
Bateman et al.

(10) Patent No.: US 6,906,318 B2
(45) **Date of Patent: *Jun. 14, 2005**

(54) ION DETECTOR

(75) Inventors: Robert Harold Bateman, Knutsford (GB); Jeff Brown, Cheshire (GB); Martin Green, Cheshire (GB)

(73) Assignee: Micromass UK Limited (GB)

(*) Notice: Subject to any disclaimer, the term of this patent is extended or adjusted under 35 U.S.C. 154(b) by 0 days.

This patent is subject to a terminal disclaimer.

(21) Appl. No.: 10/777,574

(22) Filed: Feb. 12, 2004

(65) Prior Publication Data

US 2004/0195520 A1 Oct. 7, 2004

Related U.S. Application Data

(60) Provisional application No. 60/447,753, filed on Feb. 19, 2003.

(30) Foreign Application Priority Data

Feb. 13, 2003 (GB) .............................................. 0303310
Apr. 14, 2003 (GB) .............................................. 0308592

(51) Int. Cl.[7] .......................... B01D 59/44; H01J 49/00; G01K 1/08

(52) U.S. Cl. ........................ 250/281; 250/287; 250/387

(58) Field of Search ................................. 250/287, 281, 250/310, 397; 313/105 CM, 103 CM

(56) References Cited

U.S. PATENT DOCUMENTS

| | | | | |
|---|---|---|---|---|
| 4,322,629 A | * | 3/1982 | Eloy et al. | 250/299 |
| 4,398,090 A | * | 8/1983 | Eloy et al. | 250/299 |
| 5,349,185 A | * | 9/1994 | Mendenhall | 250/287 |
| 5,402,034 A | * | 3/1995 | Blouch et al. | 313/103 CM |
| 5,466,940 A | * | 11/1995 | Litman et al. | 250/397 |
| 6,051,831 A | * | 4/2000 | Koster | 250/281 |
| 6,229,142 B1 | * | 5/2001 | Bateman et al. | 250/287 |
| 6,614,019 B2 | * | 9/2003 | Feller et al. | 250/287 |
| 6,828,729 B1 | * | 12/2004 | Owens et al. | 313/103 CM |

FOREIGN PATENT DOCUMENTS

| | | |
|---|---|---|
| JP | 262040147 A | 2/1987 |
| JP | 10283981 A | 10/1998 |
| JP | 2001273867 A | 10/2001 |

* cited by examiner

*Primary Examiner*—Nikita Wells
*Assistant Examiner*—Johnnie L Smith, II
(74) *Attorney, Agent, or Firm*—Anthony J. Janiuk

(57) ABSTRACT

An ion detector 7 for a mass spectrometer is disclosed comprising a microchannel plate 8 which receives ions 12 at an input surface and releases secondary electrons 16 from an output surface. A detecting device 9 having a detecting surface is arranged to receive at least some of the electrons 16 emitted by the microchannel plate 8. The area of the detecting surface is substantially greater than the area of the output surface of the microchannel plate 8.

86 Claims, 12 Drawing Sheets

ION DETECTOR

CROSS REFERENCED TO RELATED APPLICATIONS

This application claims priority from United Kingdom patent applications GB 0303310.7, filed 13 Feb. 2003, GB 0308592.5, filed 14 Apr. 2003 and U.S. Provisional Application 60/447,753, filed 19 Feb. 2003. The contents of these applications are incorporated herein by reference.

FIELD OF INVENTION

The present invention relates to detector for use in a mass spectrometer, a mass spectrometer, a method of detecting particles, especially ions, and a method of mass spectrometry.

BACKGROUND INFORMATION

A known ion detector for a mass spectrometer comprises a microchannel plate ("MCP") detector. A microchannel plate consists of a two-dimensional periodic array of very small diameter glass capillaries (channels) fused together and sliced into a thin plate. The microchannel plate detector may comprise several million channels, each channel operating in effect as an independent electron multiplier. An ion entering a channel will interact with the wall of the channel causing secondary electrons to be released from the wall of the channel. The secondary electrons are then accelerated towards an output surface of the microchannel plate by an electric field which is maintained across the length of the microchannel plate by applying a voltage difference across the microchannel plate.

The secondary electrons generated by an incident ion will travel along a channel on parabolic trajectories until the secondary electrons strike the wall of the channel and cause further secondary electrons to be generated or released. This process of generating secondary electrons is repeated along the length of the channel such that a cascade of several thousand secondary electrons may result from the incidence of a single ion. The secondary electrons then emerge from the output surface of the microchannel plate and are detected.

It is known to provide two microchannel plates sandwiched together and operated in series. The two microchannel plates are maintained at a high gain so that a single ion arriving at the first microchannel plate may cause a pulse of, for example, $10^7$ or more electrons to be emitted from the output surface of the rearmost of the two microchannel plates. The two microchannel plates may be arranged in a chevron arrangement wherein the microchannel plates are arranged in face to face contact such that the channels in one microchannel plate are arranged at an angle with respect to the channels of the other microchannel plate. This arrangement helps to suppress ion feedback which may otherwise lead to damage.

The requirements of an electron multiplier in a Time of Flight mass spectrometer are particularly stringent. The electron multiplier should produce minimal spectral peak broadening and provide a linear response at both low and high ion arrival rates whilst allowing single ion events to be distinguished clearly from electronic noise.

In order to achieve these criteria the output of an electron multiplier due to an individual ion arrival event should have minimal temporal spread and the pulse height distribution of the electrons should be as narrow as possible. In addition, the gain of the electron multiplier should preferably be in the order of $10^6$ or greater to allow single ion events to be easily distinguished from electronic noise.

For ion counting applications microchannel plate ion detectors have so far yielded the most satisfactory characteristics in terms of these criteria. However, under optimal operating conditions the dynamic range of microchannel plate ion detectors can be limited.

Under conditions of high gain, for example $10^6$–$10^7$, the output current from a single channel of a microchannel plate will become space-charge saturated, leading to narrow pulse height distributions approaching gaussian distributions. Narrow pulse height distributions are advantageous for ion counting devices using Time to Digital Converters ("TDC") as they allow the majority of single ion events to be distinguished from electronic noise. Narrow pulse height distributions are also advantageous for use with Analogue to Digital Converters ("ADC") as they allow for accurate quantitation at low count rates and an improved dynamic range.

The maximum output current of a microchannel plate detector is limited by the recovery time of the individual channels after illumination and the total number of channels illuminated per unit time. Ions incident upon a microchannel plate detector in an orthogonal acceleration Time of Flight mass analyser will illuminate a discrete area of the microchannel plate detector. Accordingly, ions will be incident upon only a portion of the total number of microchannels available regardless of the area of the microchannel plate. Therefore, when large ion currents are incident upon the microchannel plate ion detector or at certain steady state output currents a significant proportion of channels will not recover fully after illumination and hence the overall gain of the microchannel plate ion detector will be reduced. In particular, the final 20% of the length of the channels in the final gain stage of a microchannel plate ion detector will be limited by this saturation point first. This has the result of causing there to be a non-linearity in the response of the ion detector for quantitative analysis which will result in inaccurate isotopic ratio determinations and inaccurate mass measurements.

In order to increase the maximum input event rate which the ion detector can accommodate before saturation occurs, the gain of the microchannel plate could in theory be reduced. However, reducing the gain would cause broadening of the pulse height distribution and would shift the pulse height distribution to a lower intensity resulting in a compromise in the ability of the ion detector to detect all single ion arrivals above the threshold of electronic noise.

The limitations of a conventional microchannel plate ion detector will now be considered in more detail below. In particular, two microchannel plates arranged as a chevron pair will be considered. After a cloud of electrons has exited an individual channel in a microchannel plate the charge within the channel walls must be replenished. For a circular microchannel plate the number of channels N is given by:

$$N = \frac{\pi D^2}{\sqrt{12}\, p^2}$$

where D is the diameter of the microchannel plate and p is the channel centre to centre spacing (channel pitch).

For a circular microchannel plate having a diameter of 25 mm and comprising channels having a diameter of 10 $\mu$m and a channel pitch of 12 $\mu$m, the total number of channels N is $3.9\times10^6$. Typically, the total resistance of such a single microchannel plate is $10^8$ Ω. Therefore, the resistance $R_c$ of a single channel of the microchannel plate is approximately $3.9\times10^{14}$ Ω.

The total capacitance of a single microchannel plate may be approximated by considering it to be a pair of parallel metal plates separated by a relatively thin glass plate. The total capacitance C may be approximated as:

$$C = \frac{\varepsilon\varepsilon_0 S}{d}$$

where C is the capacitance in Farads, $\in$ is the dielectric of glass (approximately 8.3 F/m), $\in_0$ is the permittivity of a vacuum $8.854\times10^{-12}$, S is the area of the microchannel plate and d is the thickness of the microchannel plate.

Therefore, if the thickness d of the microchannel plate is taken to be 0.46 mm, the total capacitance C of a single microchannel plate is 78 pF and hence the capacitance $C_c$ for each channel of the microchannel plate is $2\times10^{-17}$ F.

The time constant $\tau$ for recovery of an individual channel in the microchannel plate after an ion event is given by:

$$C_c R_c = \tau$$

In this example the time constant $\tau$ for an individual channel is 7.8 ms. For a pair of microchannel plates in a chevron pair arrangement a primary ion event at the input surface of the first microchannel plate typically results in secondary electrons illuminating approximately ten channels on the input surface of the second microchannel plate. Assuming the first and second microchannel plates are identical, then the maximum ion input event rate E at the first microchannel plate is given by:

$$E = \frac{N}{10\tau}$$

Accordingly, the maximum ion input event rate $E_{max}$ at the first microchannel plate which is sustainable without appreciable overall loss of gain of the whole ion detector is approximately:

$$E_{\max} = \frac{E}{10}$$

In the example given above the maximum input event rate $E_{max}$ is $5\times10^6$ events/s. At a mean gain of $5\times10^6$ this equates to a maximum output current $I_{max}$ of $4\times10^{-6}$ A.

Orthogonal acceleration Time of Flight mass spectrometers commonly have very large ion currents at sampling repetition rates of tens of kHz. Under these conditions the input ion current to the microchannel plate approximates to a steady DC input current. The gain of the microchannel plate is constant until the microchannel plate output current exceeds approximately 10% of the available current passing through the microchannel plate, i.e. strip current. In the example given above the maximum output current $I_{max}$ is $10^{-6}$ A when 1000 V is maintained across the microchannel plate.

Several approaches have been developed to overcome this limitation in the maximum output current from a microchannel plate. For example, reducing the resistance of the microchannel plate reduces the time constant $\tau$ for channel recovery and increases the strip current available and hence increases the maximum output current from the microchannel plate. However, there are also practical limitations. The negative temperature coefficient of resistance of the channel walls in the microchannel plate ultimately results in thermal instability as the resistance of the microchannel plate is reduced. This causes heating of the microchannel plate which can result in ion feedback leading to thermal runaway which may result in local melting of the microchannel plate glass. The mechanism by which heat is dissipated from a microchannel plate is predominantly by radiation from the surface of the microchannel plate and the heat dissipation is therefore directly proportional to the exposed surface area of the microchannel plate.

It has been found experimentally that it is not practical to operate microchannel plates at levels of heat generation above 0.01 W/cm$^2$. For a circular microchannel plate having a diameter of 33 mm and maintained at a bias voltage of 1000 V, this rate of heat generation corresponds to a microchannel plate having a total resistance of approximately $10^7$ $\Omega$. As a consequence of this limitation on the microchannel plate total resistance, it should be noted that the maximum output current of the microchannel plate cannot be increased by simply decreasing the diameter of the channels in the microchannel plate in order to increase the number of channels available per unit area. For example, a circular microchannel plate having a diameter of 33 mm, corresponding to an active diameter of 25 mm, and comprising channels having a diameter of 10 $\mu$m and a channel pitch of 12 $\mu$m will have a total of $3.9\times10^6$ channels. If the microchannel plate has a total resistance of $10^7$ $\Omega$ then the resistance of each channel will be $3.9\times10^{13}$ $\Omega$. For a circular microchannel plate having the same diameter, the same total resistance, a reduced channel diameter of 5 $\mu$m and a reduced channel pitch of 6 $\mu$m the total number of channels will be $1.6\times10^7$. Accordingly, each channel will now have an increased resistance of $1.6\times10^{14}$ $\Omega$. In this example, it is shown that by reducing the diameter and pitch of the channels in the microchannel plate the total number of channels has increased by a factor of approximately ×4. However, the resistance per channel and hence the time constant for recovery of an individual channel $\tau$ has also increased by the same factor. Therefore, no overall gain in the maximum output current of the microchannel plate is obtained.

Direct cooling of the microchannel plate does in theory allow very low resistance microchannel plates to be employed. However, such direct cooling is impractical in most situations.

Another method of increasing the maximum output current of the microchannel plate is to disperse the incoming ion beam over a relatively large microchannel plate or over the input surface of multiple microchannel plates. This dispersion of the ion beam increases the number of channels available without changing the characteristics of the individual channels in the microchannel plate. The overall resistance of the microchannel plate ion detector is therefore reduced resulting in a higher available strip current and hence a higher onset level of channel saturation.

In this arrangement the microchannel plate(s) may be operated under relatively stable conditions since the surface area available for radiative cooling of the microchannel plate(s) is also increased. However, deliberately diverging the ion beam as it travels towards the ion detector is impractical in many situations depending on the geometry and size of an individual mass spectrometer. Furthermore, in order to diverge the ion beam electric fields must be provided in the region of the mass spectrometer upstream of the ion detector. This is particularly disadvantageous in a Time of Flight mass spectrometer in which the region upstream of the ion detector is a drift region since the introduction of an electric field into the drift region may affect the resolution and mass measurement accuracy of the ion detection system. In addition, the electric field conditions are required to be changed when detecting negative and positive ions. Therefore, diverging the ion beam is not a practical solution to this problem.

It is therefore desired to provide an improved detector for a mass spectrometer.

SUMMARY

According to a first aspect of the present invention there is provided a detector for use in a mass spectrometer. The detector comprises a microchannel plate, wherein in use particles are received at an input surface of the microchannel plate and electrons are released from an output surface of the microchannel plate, the output surface having a first area. The detector further comprises a detecting device having a detecting surface arranged to receive in use at least some of the electrons released from the microchannel plate, the detecting surface having a second area. The second area is substantially greater than the first area.

In a preferred embodiment the second area is at least 5%, 10%, 15%, 20%, 25%, 30%, 35%, 40%, 45%, 50%, 55%, 60%, 65%, 70%, 75%, 80%, 85%, 90%, 95% or 100% greater than the first area. Preferably, the second area is at least 150%, 200%, 250%, 300%, 350%, 400%, 450% or 500% greater than the first area.

According to another aspect of the present invention there is provided a detector for use in a mass spectrometer, the detector comprising a microchannel plate, wherein in use particles are received at an input surface of the microchannel plate and electrons are released from an output surface of the microchannel plate, wherein on average x electrons per unit area are released from the output surface. The detector further comprises a detecting device having a detecting surface arranged to receive in use at least some of the electrons generated by the microchannel plate, wherein on average y electrons per unit area are received on the detecting surface and wherein x>y.

Preferably, on average x electrons per unit area per unit time are released from the output surface and on average y electrons per unit area per unit time are received on the detecting surface.

In a preferred embodiment x is at least 5%, 10%, 15%, 20%, 25%, 30%, 35%, 40%, 45%, 50%, 55%, 60%, 65%, 70%, 75%, 80%, 85%, 90%, 95% or 100% greater than y. Preferably, x is at least 150%, 200%, 250%, 300%, 350%, 400%, 450% or 500% greater than the first area.

Preferably, the particles received by the detector are ions, photons or electrons.

In the preferred embodiment, the electrons released from the output surface of the microchannel plate are released into a region having an electric field. The detector may comprise one or more electrodes arranged such that an electric field is provided between the microchannel plate and the detecting device. The one or more electrodes may comprise one or more annular electrodes, one or more Einzel lens arrangements comprising three or more electrodes, one or more segmented rod sets, one or more tubular electrodes and/or one or more quadrupole, hexapole, octapole or higher order rod sets. The one or more electrodes may alternatively or in addition comprise a plurality of electrodes having apertures of substantially the same area through which electrons are transmitted in use and/or a plurality of electrodes having apertures that become progressively smaller or larger in a direction towards the detecting device and through which electrons are transmitted in use.

In the preferred embodiment, the output surface of the microchannel plate is maintained at a first potential and the detecting surface of the detecting device is maintained at a second potential. The second potential is preferably more positive than the first potential. The potential difference between the surface of the detecting device and the output surface of the microchannel plate may be selected from the group consisting of 0–50 V, 50–100 V, 100–150 V, 150–200 V, 200–250 V, 250–300 V, 300–350 V, 350–400 V, 400–450 V, 450–500 V, 500–550 V, 550–600 V, 600–650 V, 650–700 V, 700–750 V, 750–800 V, 800–850 V, 850–900 V, 900–950 V, 950–1000 V, 1.0–1.5 kV, 1.5–2.0 kV, 2.0–2.5 kV, >2.5 kV and <10 kV.

In another embodiment the one or more electrodes disposed between the microchannel plate and the detecting surface may be maintained at a third potential and/or a fourth potential and/or a fifth potential. The third and/or fourth and/or fifth potential may be substantially equal to the first and/or second potential, may be more positive than the first and/or second potential and/or may be more negative than the first and/or second potential. Preferably, the potential difference between the third and/or fourth and/or fifth potential and the first and/or the second potential is selected from the group consisting of 0–50 V, 50–100 V, 100–150 V, 150–200 V, 200–250 V, 250–300 V, 300–350 V, 350–400 V, 400–450 V, 450–500 V, 500–550 V, 550–600 V, 600–650 V, 650–700 V, 700–750 V, 750–800 V, 800–850 V, 850–900 V, 900–950 V, 950–1000 V, 1.0–1.5 kV, 1.5–2.0 kV, 2.0–2.5 kV, >2.5 kV and <10 kV.

In one embodiment the third and/or fourth and/or fifth potential is intermediate the first and/or the second potentials.

Preferably, the detector further comprises a grid electrode arranged between the microchannel plate and the detecting device. The grid electrode may be substantially hemispherical or otherwise non-planar.

In one embodiment the detecting device comprises a single detecting region. The single detecting region may comprise an electron multiplier, a scintillator, a photomultiplier tube or one or more microchannel plates. In a preferred embodiment the detecting device comprises one or more microchannel plates which receive in use over a first number of channels at least some electrons released from a second number of channels of the microchannel plate arranged upstream of the detecting device, wherein the first number of channels is substantially greater than the second number of channels.

In another preferred embodiment, the detecting device comprises a first detecting region and at least a second separate detecting region. The second detecting region may be spaced apart from the first detecting region. The first and second detecting regions may have substantially equal detecting areas or alternatively substantially different detecting areas.

In one embodiment, the area of the first detecting region is greater than the area of the second detecting region by a percentage p, wherein p is selected from the group consisting of <10%, 10–20%, 20–30%, 30–40%, 40–50%, 50–60%, 60–70%, 70–80%, 80–90% and >90%.

Preferably, in use the number of electrons received by the first detecting area is greater than the number of electrons received by the second detecting area, or vice versa, by a percentage q, wherein q is selected from the group consisting of, <10%, 10–20%, 20–30%, 30–40%, 40–50%, 50–60%, 60–70%, 70–80%, 80–90% and >90%.

A preferred embodiment comprises at least one electrode arranged so that in use at least some electrons released from the microchannel plate are guided to the first detecting region and/or at least some electrons released from the microchannel plate are guided to the second detecting region. The first and/or second detecting region may comprise, one or more microchannel plates, an electron multiplier, a scintillator or a photo-multiplier tube. Preferably, the detecting device comprises at least one chevron pair of microchannel plates.

The detector may further comprise at least one collector plate arranged to receive in use at least some electrons generated and released by the detecting device. The at least one collector plate may be shaped to at least partially compensate for a temporal spread in the flight time of electrons incident on the detecting device. Alternatively, or in addition the detecting device may be shaped to at least partially compensate for a temporal spread in the flight time of electrons incident on the detecting device. Preferably, one or more electrodes are also arranged so as to at least partially compensate for a temporal spread in the flight time of electrons incident on the detecting device. The one or more electrodes may be arranged to accelerate or decelerate electrons released from different portions of the microchannel plate or accelerate the electrons by different amounts to compensate for the temporal speed in the flight time of the electrons. For example, the electrons released from the centre of the microchannel plate may be accelerated relative to the electrons released from the outer portions of the microchannel plates.

According to another aspect the invention provides a detector for use in a mass spectrometer, the detector comprising a microchannel plate, wherein in use particles are received at an input surface of the microchannel plate and electrons are released from an output surface of the microchannel plate, the output surface having a first area. The detector further comprises a detecting device having a detecting surface having a second area and a first device arranged between the microchannel plate and the detecting device. The first device is arranged to receive at least some of the electrons released from the output surface of the microchannel plate and to generate photons. A second device is arranged between the first device and the detecting device. The second device is arranged to receive at least some of the photons generated by the first device and to release electrons. The detecting surface is arranged to receive at least some of the electrons generated by the second device and the second area is substantially greater than the first area.

In a preferred embodiment, the second area is at least 5%, 10%, 15%, 20%, 25%, 30%, 35%, 40%, 45%, 50%, 55%, 60%, 65%, 70%, 75%, 80%, 85%, 90%, 95% or 100% greater than the first area. Preferably, the second area is at least 150%, 200%, 250%, 300%, 350%, 400%, 450% or 500% greater than the first area.

According to a further aspect the present invention provides a detector for use in a mass spectrometer, the detector comprising a microchannel plate, wherein in use particles are received at an input surface of the microchannel plate and electrons are released from an output surface of the microchannel plate, wherein on average x electrons per unit area are released from the output surface. The detector further comprises a detecting device having a detecting surface having a second area and a first device arranged between the microchannel plate and the detecting device. The first device is arranged to receive at least some of the electrons released from the output surface and to generate photons. A second device is arranged between the first device and the detecting device and is arranged to receive at least some of the photons generated by the first device and to release electrons. The detecting surface is arranged to receive at least some of the electrons generated by the second device and receives on average y electrons per unit area, wherein x>y.

In the preferred embodiment, x is at least 5%, 10%, 15%, 20%, 25%, 30%, 35%, 40%, 45%, 50%, 55%, 60%, 65%, 70%, 75%, 80%, 85%, 90%, 95% or 100% greater than y. Preferably, x is at least 150%, 200%, 250%, 300%, 350%, 400%, 450% or 500% greater than y.

From another aspect the present invention provides a detector for use in a mass spectrometer, the detector comprising a microchannel plate, wherein in use particles are received at an input surface of the microchannel plate and electrons are released from an output surface of the microchannel plate, the output surface having a first area. The detector further comprises a detecting device having a detecting surface having a second area and a first device arranged between the microchannel plate and the detecting device. The first device is arranged to receive at least some of the electrons released from the output surface of the microchannel plate and to generate photons. The detecting surface is arranged to receive at least some of the photons generated by the first device. The second area is substantially greater than the first area.

The second area is preferably at least 5%, 10%, 15%, 20%, 25%, 30%, 35%, 40%, 45%, 50%, 55%, 60%, 65%, 70%, 75%, 80%, 85%, 90%, 95% or 100% greater than the first area and may be at least 150%, 200%, 250%, 300%, 350%, 400%, 450% or 500% greater than the first area.

From a further aspect the present invention provides a detector for use in a mass spectrometer, the detector comprising a microchannel plate, wherein in use particles are received at an input surface of the microchannel plate and electrons are released from an output surface of the microchannel plate, wherein on average x electrons per unit area are released from the output surface. The detector further comprises a detecting device and a first device arranged between the microchannel plate and the detecting device. The first device is arranged to receive at least some of the electrons released from the output surface of the microchannel plate and to generate photons. The detecting device is arranged to receive at least some of the photons generated by the first device and receives on average z photons per unit area, wherein x>z.

In a preferred embodiment x is at least 5%, 10%, 15%, 20%, 25%, 30%, 35%, 40%, 45%, 50%, 55%, 60%, 65%, 70%, 75%, 80%, 85%, 90%, 95% or 100% greater than z. Preferably, x is at least 150%, 200%, 250%, 300%, 350%, 400%, 450% or 500% greater than z.

In the preferred embodiment the photons are UV photons.

According to another aspect the present invention provides a mass spectrometer comprising a detector as described above.

Preferably, the detector forms part of a Time of Flight mass analyser. In one embodiment, the mass spectrometer further comprising an Analogue to Digital Converter ("ADC") connected to the detector and/or a Time to Digital Converter ("TDC") connected to the detector.

The mass spectrometer may comprise an ion source selected from the group consisting of an Electrospray Ionisation ("ESI") ion source, an Atmospheric Pressure Ionisation ("API") ion source, an Atmospheric Pressure Chemical Ionisation ("APCI") ion source, an Atmospheric Pressure Photo Ionisation ("APPI") ion source, a Laser Desorption Ionisation ("LDI") ion source, an Inductively Coupled Plasma ("ICP") ion source, a Fast Atom Bombardment ("FAB") ion source, a Liquid Secondary Ion Mass Spectrometry ("LSIMS") ion source, a Field Ionisation ("FI") ion source, a Field Desorption ("FD") ion source, an Electron Impact ("EI") ion source, a Chemical Ionisation ("CI") ion source and a Matrix Assisted Laser Desorption Ionisation ("MALDI") ion source. The ion source may be continuous or pulsed.

Another aspect of the present invention provides a method of detecting particles comprising receiving particles at an input surface of a microchannel plate and, releasing electrons from an output surface of the microchannel plate, the output surface having a first area. The method further comprises receiving at least some of the electrons on a detecting surface of a detecting device, said detecting surface having a second area, wherein the second area is substantially greater than the first area.

Preferably, the second area is at least 5%, 10%, 15%, 20%, 25%, 30%, 35%, 40%, 45%, 50%, 55%, 60%, 65%, 70%, 75%, 80%, 85%, 90%, 95% or 100% greater than the first area. The second area may be at least 150%, 200%, 250%, 300%, 350%, 400%, 450% or 500% greater than the first area.

From a further aspect the present invention provides a method of detecting particles comprising receiving particles at an input surface of a microchannel plate, releasing on average x electrons per unit area from an output surface of the microchannel plate and receiving at least some of the electrons on a detecting surface of a detecting device, wherein the detecting surface receives on average y electrons per unit area and wherein x>y.

Preferably, x is at least 5%, 10%, 15%, 20%, 25%, 30%, 35%, 40%, 45%, 50%, 55%, 60%, 65%, 70%, 75%, 80%, 85%, 90%, 95% or 100% greater than y. In another embodiment x may be at least 150%, 200%, 250%, 300%, 350%, 400%, 450% or 500% greater than y.

From another aspect the present invention provides a method of detecting particles comprising receiving particles at an input surface of a microchannel plate and releasing electrons from an output surface of the microchannel plate, the output surface having a first area. The method further comprises receiving at least some of the electrons on a first device, the first device generating photons in response thereto, receiving at least some of the photons on a second device, the second device generating and releasing electrons in response thereto and receiving at least some of the electrons generated by the second device on a detecting device. The detecting device has a detecting surface having a second area, wherein the second area is greater than the first area.

In one embodiment the second area is at least 5%, 10%, 15%, 20%, 25%, 30%, 35%, 40%, 45%, 50%, 55%, 60%, 65%, 70%, 75%, 80%, 85%, 90%, 95% or 100% greater than the first area. In another embodiment the second area is at least 150%, 200%, 250%, 300%, 350%, 400%, 450% or 500% greater than the first area.

From a further aspect the present invention provides a method of detecting particles comprising receiving particles at an input surface of a microchannel plate and releasing on average x electrons per unit area from an output surface of the microchannel plate. The method further comprises receiving at least some of the electrons on a first device, the first device generating photons in response thereto, receiving at least some of the photons on a second device, the second device generating and releasing electrons in response thereto and receiving at least some of the electrons generated by the second device on a detecting surface of a detecting device, the detecting surface receiving on average y electrons per unit area, wherein x>y.

In one embodiment x is at least 5%, 10%, 15%, 20%, 25%, 30%, 35%, 40%, 45%, 50%, 55%, 60%, 65%, 70%, 75%, 80%, 85%, 90%, 95% or 100% greater than y. In another embodiment x is at least 150%, 200%, 250%, 300%, 350%, 400%, 450% or 500% greater than y.

From a further aspect the present invention provides a method of detecting particles comprising receiving particles at an input surface of a microchannel plate, releasing electrons from an output surface of the microchannel plate, the output surface having a first area, receiving at least some of the electrons on a device, the device generating photons in response thereto, receiving at least some of the photons generated by the device on a detecting surface of a detecting device having a second area, wherein the second area is substantially greater than the first area.

In a preferred embodiment, the second area is at least 5%, 10%, 15%, 20%, 25%, 30%, 35%, 40%, 45%, 50%, 55%, 60%, 65%, 70%, 75%, 80%, 85%, 90%, 95% or 100% greater than the first area. In another embodiment the second area is at least 150%, 200%, 250%, 300%, 350%, 400%, 450% or 500% greater than the first area.

From a further aspect the present invention provides a method of detecting particles comprising, receiving particles at an input surface of a microchannel plate, releasing on average x electrons per unit area from an output surface of the microchannel plate, receiving at least some of the electrons on a device, the device generating photons in response thereto, receiving at least some of the photons generated by the device on a detecting surface of a detecting device, the detecting surface receiving on average z photons per unit area, wherein x>z.

Preferably, on average x electrons per unit area per unit time are released from the output surface and on average z photons per unit area per unit time are received on the detecting surface.

In a preferred embodiment, x is at least 5%, 10%, 15%, 20%, 25%, 30%, 35%, 40%, 45%, 50%, 55%, 60%, 65%, 70%, 75%, 80%, 85%, 90%, 95% or 100% greater than z. In another embodiment x is at least 150%, 200%, 250%, 300%, 350%, 400%, 450% or 500% greater than z.

From a further aspect the present invention provides a method of mass spectrometry comprising a method of detecting particles as described above.

According to another aspect the present invention provides a detector for use in a mass spectrometer, the detector comprising a microchannel plate, wherein in use particles are received at an input surface of the microchannel plate and electrons are released from an output surface of the microchannel plate, the output surface having a first area. The detector further provides a detecting device having a detecting surface arranged to receive in use at least some of the electrons released from the microchannel plate, the detecting surface having a second area. At a first time $t_1$ electrons released from the microchannel plate are received on a first portion or region of the detecting surface and at a second later time $t_2$ electrons released from the microchannel plate are received on a second different portion or region of the detecting surface.

In a preferred embodiment, at a third time $t_3$ later than the second time $t_2$ electrons released from the microchannel plate are received on the first portion or region of the detecting surface. At a fourth time $t_4$ later than the third time $t_3$ electrons released from the microchannel plate may be received on the second portion or region of the detecting surface.

Preferably, the second area is substantially greater than the first area. The second area may be at least 5%, 10%, 15%, 20%, 25%, 30%, 35%, 40%, 45%, 50%, 55%, 60%, 65%, 70%, 75%, 80%, 85%, 90%, 95%, 100%, 150%, 200%, 250%, 300%, 350%, 400%, 450% or 500% greater than the first area.

In the preferred embodiment, in use x electrons per unit area are on average released from the output surface and in use y electrons per unit area are on average received on either the first portion or region and/or the second portion or region of the detecting surface. In one embodiment x>y and x may be at least 5%, 10%, 15%, 20%, 25%, 30%, 35%, 40%, 45%, 50%, 55%, 60%, 65%, 70%, 75%, 80%, 85%, 90%, 95%, 100%, 150%, 200%, 250%, 300%, 350%, 400%, 450% or 500% greater than y. In another embodiment, x is substantially equal to y. In a further embodiment x<y and x may be at least 5%, 10%, 15%, 20%, 25%, 30%, 35%, 40%, 45%, 50%, 55%, 60%, 65%, 70%, 75%, 80%, 85%, 90%, 95%, 100%, 150%, 200%, 250%, 300%, 350%, 400%, 450% or 500% less than y.

Preferably the particles received at the input surface are ions, photons or electrons.

In a preferred embodiment, in use electrons are released from the output surface of the microchannel plate into a region having an electric field. Preferably, at the first time $t_1$ the electric field is in a first electric field direction and at the second later time $t_2$ the electric field is in a second different electric field direction. At a third time $t_3$ later than the second time $t_2$ the electric field may be in the first electric field direction. At a fourth time $t_4$ later than the third time $t_3$ the electric field may be in the second electric field direction.

In a preferred embodiment the first and/or the second electric field directions may be inclined at an angle to the normal of the microchannel plate. Preferably, the direction of the electric field is varied substantially continuously with time so as to substantially continuously move, guide or rotate electrons released from the output surface of the microchannel plate around, across or over the detecting surface. Alternatively, the direction of the electric field may be varied in a substantially stepped manner with time so as to substantially move, guide or rotate electrons released from the output surface of the microchannel plate around, across or over the detecting surface in a substantially stepped manner.

At the first time $t_1$ the electric field may have a first electric field strength and at the second later time $t_2$ the electric field may have a second electric field strength. The first electric field strength may be substantially the same or different to the second electric field strength. At a third time $t_3$ later than the second time $t_2$ the electric field may have the first electric field strength and at a fourth time $t_4$ later than the third time $t_3$ the electric field may have the second electric field strength.

In one embodiment, the electric field strength is varied substantially continuously with time so as to substantially continuously move, guide or rotate electrons released from the output surface of the microchannel plate around, across or over the detecting surface. In another embodiment the electric field strength is varied in a substantially stepped manner with time so as to move, guide or rotate electrons released from the output surface of the microchannel plate around, across or over the detecting surface.

The preferred detector may further comprise at least one reflecting electrode for reflecting electrons towards the detecting device. The at least one reflecting electrode may be arranged in a plane substantially parallel to the microchannel plate and is preferably arranged so as to guide electrons released from the microchannel plate on to the first portion or region of the detecting surface at the first time $t_1$ and to guide electrons released from the microchannel plate on to the second portion or region of the detecting surface at the second later time $t_2$.

The preferred embodiment comprises one or more electrodes arranged between the microchannel plate and the detecting device such that an electric field is provided between the microchannel plate and the detecting device. The one or more electrodes may comprise one or more annular electrodes, one or more Einzel lens arrangements comprising three or more electrodes, one or more segmented rod sets, one or more tubular electrodes, one or more quadrupole, hexapole, octapole or higher order rod sets, a plurality of electrodes having apertures of substantially the same area through which electrons are transmitted in use and/or a plurality of electrodes having apertures which become progressively smaller or larger in a direction towards the detecting device through which electrons are transmitted in use.

Preferably, the output surface of the microchannel plate is maintained at a first potential and the detecting surface of the detecting device is maintained at a second potential. The second potential is preferably more positive than the first potential. The potential difference between the surface of the detecting device and the output surface of the microchannel plate may be selected from the group consisting of 0–50 V, 50–100 V, 100–150 V, 150–200 V, 200–250 V, 250–300 V, 300–350 V, 350–400 V, 400–450 V, 450–500 V, 500–550 V, 550–600 V, 600–650 V, 650–700 V, 700–750 V, 750–800 V, 800–850 V, 850–900 V, 900–950 V, 950–1000 V, 1.0–1.5 kV, 1.5–2.0 kV, 2.0–2.5 kV, >2.5 kV and <10 kV.

In the preferred detector the output surface of the microchannel plate is maintained at a first potential, the detecting surface of the detecting device is maintained at a second potential and one or more electrodes disposed between the microchannel plate and the detecting surface are maintained at a third potential. Preferably, one or more electrodes disposed between the microchannel plate and the detecting surface are maintained at a fourth potential and one or more electrodes disposed between the microchannel plate and the detecting surface may be maintained at a fifth potential. The third and/or fourth and/or fifth potential may be substantially equal to the first and/or second potential, may be more positive than the first and/or second potential and/or may be more negative than the first and/or second potential.

Preferably, the potential difference between the third and/or fourth and/or fifth potential and the first and/or the second potential is selected from the group consisting of 0–50 V, 50–100 V, 100–150 V, 150–200 V, 200–250 V, 250–300 V, 300–350 V, 350–400 V, 400–450 V, 450–500 V, 500–550 V, 550–600 V, 600–650 V, 650–700 V, 700–750 V, 750–800 V, 800–850 V, 850–900 V, 900–950 V, 950–1000 V, 1.0–1.5 kV, 1.5–2.0 kV, 2.0–2.5 kV, >2.5 kV and <10 kV.

The third and/or fourth and/or fifth potential may additionally, or alternatively, be intermediate the first and/or the second potential.

In a preferred embodiment, electrons are released from the output surface of the microchannel plate into a region having a magnetic field. The detector preferably comprises one or more magnets and/or one or more electromagnets arranged such that the magnetic field is provided between the microchannel plate and the detecting device.

At the first time $t_1$ the magnetic field may be in a first magnetic field direction and at the second later time $t_2$ the magnetic field may be in a second different magnetic field direction. At a third time $t_3$ later than the second time $t_2$ the magnetic field may be in the first magnetic field direction. At a fourth time $t_4$ later than the third time $t_3$ the magnetic field may be in the second magnetic field direction. Preferably, the first magnetic field direction and/or the second magnetic field directions are substantially parallel to the microchannel plate.

In a preferred embodiment the direction of the magnetic field is varied substantially continuously with time so as to substantially continuously move, guide or rotate electrons released from the output surface of the microchannel plate around, across or over the detecting surface. In another embodiment the magnetic field is varied in a substantially stepped manner with time so as to substantially move, guide or rotate electrons released from the output surface of the microchannel plate around, across or over the detecting surface in a substantially stepped manner.

In one embodiment, at the first time $t_1$ the magnetic field has a first magnetic field strength and at the second time $t_2$ the magnetic field has a second magnetic field strength. The first magnetic field strength may be substantially the same as the second magnetic field strength or the first magnetic field strength may be substantially different to the second magnetic field strength. At a third time $t_3$ later than the second time $t_2$ the magnetic field may have the first magnetic field strength and at a fourth time $t_4$ later than the third time $t_3$ the magnetic field may have the second magnetic field strength.

In a preferred embodiment the magnetic field strength is varied substantially continuously with time so as to substantially continuously move, guide or rotate electrons released from the output surface of the microchannel plate around, across or over the detecting surface. In another embodiment the magnetic field strength is varied in a substantially stepped manner with time so as to move, guide or rotate electrons released from the output surface of the microchannel plate around, across or over the detecting surface.

The detector may further comprise a grid electrode arranged between the microchannel plate and the detecting device. The grid electrode may be substantially hemispherical or otherwise non-planar.

The detector may comprise a detecting device having a single detecting region. The single detecting region may comprise an electron multiplier, a scintillator or a photomultiplier tube. Preferably, the single detecting region comprises one or more microchannel plates and the one or more microchannel plates may receive over a first number of channels at least some electrons released from a second number of channels of the microchannel plate arranged upstream of the detecting device, wherein the first number of channels may be substantially greater than, equal to or less than the second number of channels.

In another embodiment the detector comprises a detecting device having a first detecting region and at least a second separate detecting region. The second detecting region is preferably spaced apart from the first detecting region. The first and second detecting regions may have substantially equal or different detecting areas. Preferably, the area of the first detecting region is greater than the area of the second detecting region by a percentage p, wherein p may be selected from the group consisting of <10%, 10–20%, 20–30%, 30–40%, 40–50%, 50–60%, 60–70%, 70–80%, 80–90% and >90%. Preferably, the number of electrons received by the first detecting area is greater than the number of electrons received by the second detecting area by a percentage q, wherein q is selected from the group consisting of <10%, 10–20%, 20–30%, 30–40%, 40–50%, 50–60%, 60–70%, 70–80%, 80–90% and >90%.

The first and/or second detecting region may comprise one or more microchannel plates, an electron multiplier, a scintillator or a photo-multiplier tube. Preferably, the detecting device comprises at least one chevron pair of microchannel plates.

The detector may further comprise at least one collector plate arranged to receive in use at least some electrons generated or released by the detecting device. The at least one collector plate may be shaped to at least partially compensate for a temporal spread in the flight time of electrons incident on the detecting device. Alternatively, or in addition, the detecting device may be shaped to at least partially compensate for a temporal spread in the flight time of electrons incident on the detecting device. Preferably, the detector comprises one or more electrodes arranged so as to at least partially compensate for a temporal spread in the flight time of electrons incident on the detecting device.

In the preferred embodiment one or more electrodes are arranged so as to provide an electric field between the microchannel plate and the detecting device. A time varying potential may be applied to at least one of the one or more electrodes. The amplitude of the time varying potential is preferably varied substantially sinusoidally with time. The amplitude of the time varying potential may vary at a frequency selected from the group consisting of 10–50 Hz, 50–100 Hz, 100–150 Hz, 150–200 Hz, 200–250 Hz, 250–300 Hz, 300–350 Hz, 350–400 Hz, 400–450 Hz, 450–500 Hz, 500–550 Hz, 550–600 Hz, 600–650 Hz, 650–700 Hz, 700–750 Hz, 750–800 Hz, 800–850 Hz, 850–900 Hz, 900–950 Hz, 950–1000 Hz, 1.0–1.5 kHz, 1.5–2.0 kHz, 2.0–2.5 kHz, 2.5–3.5 kHz, 3.5–4.5 kHz, 4.5–5.5 kHz, 5.5–7.5 kHz, 7.5–9.5 kHz, 9.5–12.5 kHz, 12.5–15 kHz, 15.0–20.0 kHz and >20 kHz. In the preferred embodiment, the amplitude of the potential varies at a frequency of between about 50 Hz and about 10 kHz.

Additionally, or alternatively, the time varying potential may be applied intermittently to at least one of the one or more electrodes. The frequency with which the potential is applied to the one or more electrodes may be selected from the above group.

In a preferred embodiment at least some of the electrons released from separate channels of the microchannel plate are received on substantially separate non-overlapping regions on the detecting surface.

The detecting surface may extend circumferentially around the output surface of the microchannel plate and may be substantially continuous. The detecting device may be in substantially the same plane as the microchannel plate.

From another aspect the invention provides a mass spectrometer comprising a detector as described above.

Preferably, the detector forms part of a Time of Flight mass analyser. The detector may further comprise an Analogue to Digital Converter ("ADC") and/or Time to Digital Converter ("TDC") connected to the detector.

The mass spectrometer may comprise an ion source selected from the group consisting of an Electrospray Ionisation ("ESI") ion source, an Atmospheric Pressure Ionisation ("API") ion source, an Atmospheric Pressure Chemical Ionisation ("APCI") ion source, an Atmospheric Pressure Photo Ionisation ("APPI") ion source, a Laser Desorption Ionisation ("LDI") ion source, an Inductively Coupled Plasma ("ICP") ion source, a Fast Atom Bombardment ("FAB") ion source; a Liquid Secondary Ion Mass Spectrometry ("LSIMS") ion source, a Field Ionisation ("FI") ion source, a Field Desorption ("FD") ion source, an Electron Impact ("EI") ion source, a Chemical Ionisation ("CI") ion source and a Matrix Assisted Laser Desorption Ionisation ("MALDI") ion source. The ion source may be continuous or pulsed.

From a further aspect the invention provides a method of detecting particles comprising receiving particles at an input surface of a microchannel plate, releasing electrons from an output surface of the microchannel plate, the output surface having a first area and receiving at least some of the electrons on a detecting surface of a detector having a second area. At a first time $t_1$ electrons released from the microchannel plate are received on a first portion or region of the detecting surface and at a second later time $t_2$ electrons released from the microchannel plate are received on a second different portion or region of the detecting surface.

From another aspect the present invention provides a method of mass spectrometry comprising a method of detecting particles as described above.

According to a first main preferred embodiment primary ions are incident on a first microchannel plate which generates secondary electrons in response thereto. The secondary electrons are subsequently directed towards one or more secondary microchannel plates or other detecting devices arranged to have a total area which is preferably substantially larger and spaced apart from the first microchannel plate. In this manner the secondary electrons generated by the first microchannel plate are dispersed over a larger second electron multiplying area. Dispersing the secondary electrons over a relatively large electron multiplying area is advantageous compared with dispersing the ion beam over a relatively large ion detection area as an electric field is not required to be introduced into the region upstream of the ion detector. This is particularly advantageous when the region upstream of the ion detector is the drift region of a Time of Flight mass spectrometer.

In a preferred embodiment the secondary electron current generated and then released by the output surface of the first microchannel plate is dispersed over the detecting device. Accordingly, the electrons may be dispersed over a relatively large number of channels in either a single larger microchannel plate, or multiple microchannel plates having a higher total number of channels. This is preferably achieved by diverging the secondary electrons released from the first microchannel plate or by scanning the secondary electrons over the surface of the one or more microchannel plates of the detecting device.

According to a second main preferred embodiment secondary electrons emitted from the first microchannel plate are scanned over one or more microchannel plates of a detecting device over a timescale related to the recovery time of the individual channels of the one or more microchannel plates. By distributing the secondary electrons from the first microchannel plate over the microchannel plates of the detecting device, the detector is capable of delivering a relatively high output current for a given overall gain with minimal distortion of the pulse height distributions.

In a preferred embodiment the secondary electrons released from the first microchannel plate may be split evenly or unevenly between two or more separate secondary microchannel plate arrangements, electron multiplier tubes ("EMT") or photo-multiplier tubes ("PMT"). The output current of such electron multipliers may then be coupled to a suitable processor, for example an Analogue to Digital Converter ("ADC") or a Time to Digital Converter. Alternatively, a combination of Analogue and Time to Digital Converters may be coupled to the electron multipliers. By coupling a combination of Analogue and Time to Digital Converters to the electron multipliers the dynamic range of the ion detection system as a whole may be increased.

A preferred embodiment involves allowing the primary ions to strike an input surface of a first microchannel plate arrangement so that secondary electrons are generated and released from an exit surface. The first microchannel plate may preferably be operated at a relatively low gain and the secondary electrons emitted by the first microchannel plate arrangement may preferably be defocused substantially evenly onto a second larger microchannel plate or multiple microchannel plates having a total area which is larger than the first microchannel plate. This provides an increase in the number of channels available for electron multiplication without altering the characteristics of the individual channels e.g. the time constant for channel recovery or the channel resistance. This embodiment therefore results in the capability of producing a higher maximum output current from the secondary electron multipliers without saturating the ion detector. Various methods may be employed to deflect, focus, direct or guide the beam of secondary electrons from the first microchannel plate arrangement to the second microchannel plate arrangement including employing electrostatic and/or magnetic fields.

In a preferred embodiment the detector detects particles, for example ions, at a first microchannel plate comprising a single circular microchannel plate having an active cross-sectional diameter D. A detecting device positioned behind the first microchannel plate may comprise a chevron pair of circular microchannel plates having an active diameter of 2D. In this embodiment the maximum output current of the ion detector will be approximately four times larger than the maximum output of a single chevron pair arrangement having a diameter D for the same gain.

In a preferred embodiment the first microchannel plate may comprise a single circular microchannel plate having an active diameter of 25 mm. The first microchannel plate preferably has a channel diameter of 10 $\mu$m and may have a channel pitch of 12 $\mu$m so that a total of $3.9\times10^6$ channels may be provided. The chevron pair of microchannel plates preferably have a larger active diameter of 50 mm. The channels in the chevron pair of microchannel plates may also preferably have a diameter of 10 $\mu$m and a channel pitch of 12 $\mu$m, thus giving a total of $1.6\times10^7$ channels. The resistance of each channel in the microchannel plates may be $1.2\times10^{14}$ $\Omega$. Accordingly, the total resistance of the first microchannel plate will be $3\times10^7$ $\Omega$ and the total resistance of each microchannel plate in the chevron pair of microchannel plates will be $7.5\times10^6$ $\Omega$. The channels of each of the microchannel plates preferably have a ratio of length to diameter of 46:1 although other ratios may be employed.

According to the above preferred embodiment, applying a bias voltage of 380 V across the first microchannel plate results in a mean gain of approximately ×10 across the first microchannel plate. A single ion arrival at the input surface of the first microchannel plate will therefore result in, on average, ten electrons being released from a single channel on the output surface of the first microchannel plate.

A bias voltage of 1700 V may preferably be applied across the chevron pair of microchannel plates resulting in a mean gain of approximately $5\times10^5$ across the chevron pair of microchannel plates arranged downstream of the first microchannel plate. Accordingly, the overall gain of both the first microchannel plate and the chevron pair of microchannel plates in the ion detector will be approximately $5\times10^6$.

In order to ensure that the secondary electrons released from each channel of the first microchannel plate are spread over the maximum area of the chevron pair of microchannel plates, the diameter $D_e$ of the cloud of secondary electrons released from each channel, when incident on the chevron pair of microchannel plates is preferably equal to the diameter $D_2$ of the chevron pair less the diameter $D_1$ of the first microchannel plate. In the above embodiment $D_2-D_1$ is 25 mm. The maximum exit angle $\phi$ that the secondary electrons exit the output surface of the first microchannel plate relative to the plane of the first microchannel plate is determined by the channel diameter $d_c$ and the depth P that the non-emissive coating which is applied to the output surface of the microchannel plates (end spoiling) penetrates into the channels. Typically the end spoiling of the channels is equal to one channel diameter. The maximum exit angle $\phi$ of the secondary electrons released by the first microchannel plate is calculated as below:

$$\phi = \tan^{-1}\left(\frac{d_c}{P}\right)$$

In the embodiment given above the maximum exit angle $\phi$ is 45°.

For the channel diameter, ratio of channel length to channel diameter ($l/d_c$) and end spoiling given above, the mean energy of the secondary electrons exiting the first microchannel plate may be calculated based upon the bias voltage applied across the first microchannel plate. When a bias voltage of 380 V is applied across the first microchannel plate the mean energy E of the secondary electrons that exit the first microchannel plate is 5 eV.

When a potential difference is not applied between the exit surface of the first microchannel plate and the input surface of the chevron pair of microchannel plates the diameter $D_e$ of the cloud of secondary electrons emitted from a single channel of the first microchannel plate may be calculated as follows:

$$D_e = \left(\frac{2lS}{D}\right) + D$$

where S is the distance between the output surface of the first microchannel plate and the input surface of the chevron pair of microchannel plates. Accordingly, in order to achieve a diameter $D_e$ of the cloud of secondary electrons released from a single exit channel of the first microchannel plate of 25 mm, the distances between the first microchannel plate and the chevron pair of microchannel plates should preferably be 12.5 mm. The diameter $D_e$ of the cloud of secondary electrons at the input surface of the chevron pair of microchannel plates may be varied by applying a potential $V_b$ between the output surface of the first microchannel plate and the input surface of the chevron pair of microchannel plates. In such an embodiment the diameter $D_e$ of the cloud of secondary electrons may be calculated as follows:

$$D_e = D + \frac{4ES \times \sin\phi\cos\phi}{V_b}\left(\sqrt{1 + \frac{V_b}{E \times \cos\phi^2}} - 1\right)$$

For example, for a spacing of 50 mm and potential difference of 120 V between the output surface of the first microchannel plate and the input surface of the chevron pair of microchannel plates the diameter $D_e$ of the cloud of secondary electrons at the input surface of the chevron pair of microchannel plates will be 25 mm.

In another embodiment the secondary electrons released from the first microchannel plate may be allowed to hit an organic or inorganic scintillator. An organic or plastic scintillator is preferred as the rise and decay times of such scintillators are in the order of 0.5–2 ns. Photons, emitted from the scintillator may then be directed by a light guide towards a photo-cathode window of larger area than the first microchannel plate. Alternatively, the photons emitted by the scintillator may be directed towards multiple photo-cathodes having a total area which is larger than the area of the first microchannel plate arrangement. Gallenium-Arsenide may, for example, be used as the photo-cathode material. The electrons released by the photo-cathode may then be guided towards a detecting device comprising one or more further microchannel plates. The further microchannel plates preferably also have a larger total area than the first microchannel plate. Preferably, the majority of electron multiplication is carried out at the second microchannel plate stage.

Dispersing the secondary electrons released from the first microchannel plate over one or more further second microchannel plates having a larger total area allows the input ion current to be increased by the ratio of the area of the first microchannel plate to the area of the second microchannel plate without compromising the gain of the detection system and with a minimal impact on the pulse height distribution. In addition, this embodiment advantageously allows of electrical decoupling of the output of the detector from other components of the mass spectrometer. Accordingly, the output of a detector according to a preferred embodiment may be nominally at ground potential and hence the output signal conditioning requirements can be simplified.

An embodiment of the present invention involves dispersing or guiding secondary electrons from the first microchannel plate over the surface of a second larger detecting device. The detecting device preferably comprises one or more microchannel plates having a larger total area. In this embodiment the secondary electrons may be dispersed or guided over the detecting surface by one or more electric and/or magnetic fields. In this embodiment the secondary electrons released from the first microchannel plate may not necessarily be focussed onto the detecting surface but may preferably be diverged over a relatively large area of the detecting surface. This ensures that substantially all of the channels in the one or more microchannel plates of the detecting device are utilized.

In another embodiment the secondary electrons released from the first microchannel plate are focused or guided onto a discrete area of the detecting surface of the detecting device at any one particular time. The detecting device may comprise one or more microchannel plates having a larger total area than the first microchannel plate. In this embodiment the secondary electrons are preferably focused so that the secondary electrons are preferably incident on the minimum number of channels possible in the one or more microchannel plates of the detecting device. The secondary electrons released from the first microchannel plate may preferably be continuously swept, guided or rotated or periodically switched, guided or rotated between different areas of the second microchannel plate arrangement by a time-varying electric and/or magnetic deflection field. The average number of secondary electrons received by any one area of the one or more microchannel plates of the detecting device per unit time is preferably less than the average number of secondary electrons released from an equivalent area of the first microchannel plate per unit time. In this embodiment there will advantageously be minimal broadening of the pulse height distribution because the total number of secondary electrons produced by a single ion arrival at the first microchannel plate will be distributed over relatively few channels of the one or more microchannel plates in the detecting device. Therefore, the output of each individual channel in the one or more microchannel plates of the detecting device is more likely to be space-charge limited, thereby resulting in a relatively narrow pulse height distribution.

A particular advantage of the preferred embodiment of the present invention is that the maximum average output current of the ion detector which is possible before the gain of the ion detector is adversely affected is increased compared with a conventional ion detection system.

FIGURES

Various embodiments of the present invention together with other arrangements given for illustrative purposes only will now be described, by way of example only, and with reference to the accompanying drawings in which.

Figure 9A:
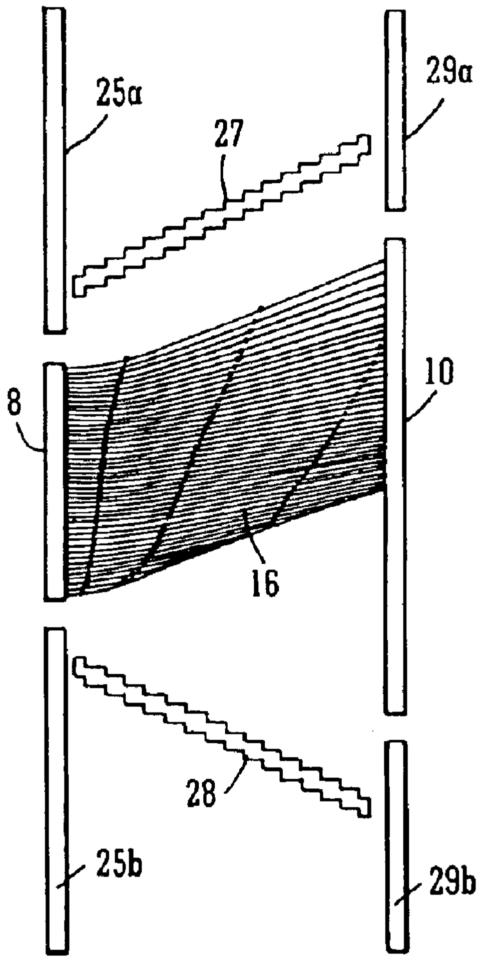
Figure 9B:
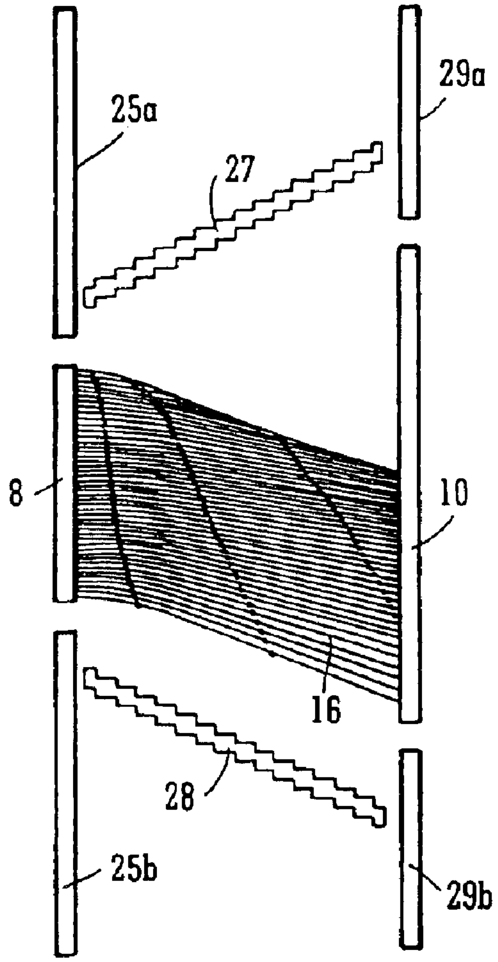
Figure 10A:
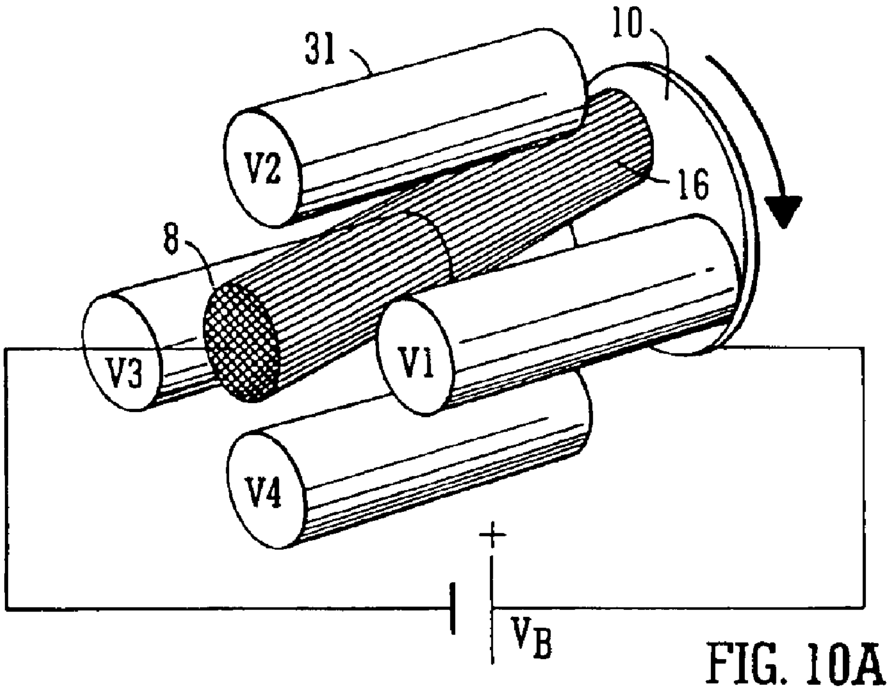
Figure 10B:
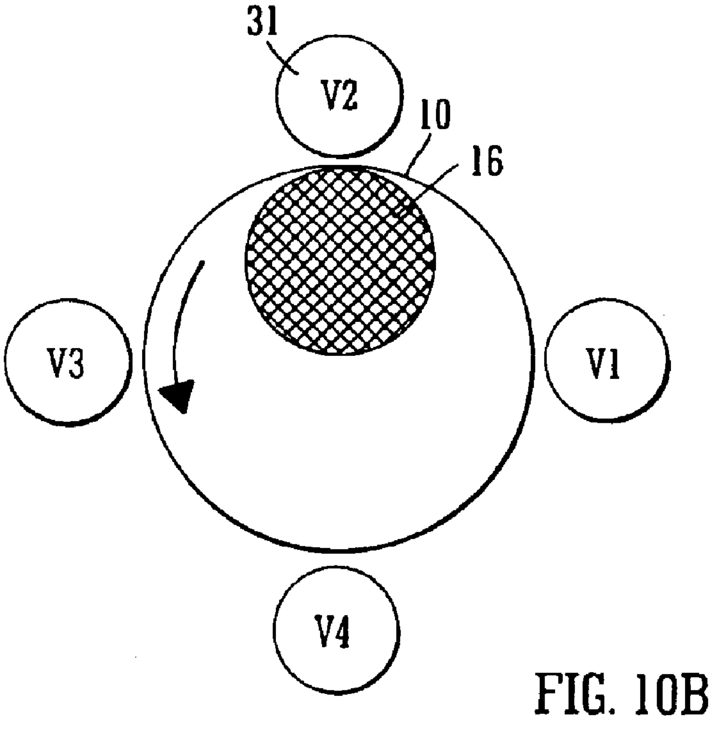
Figure 11A:
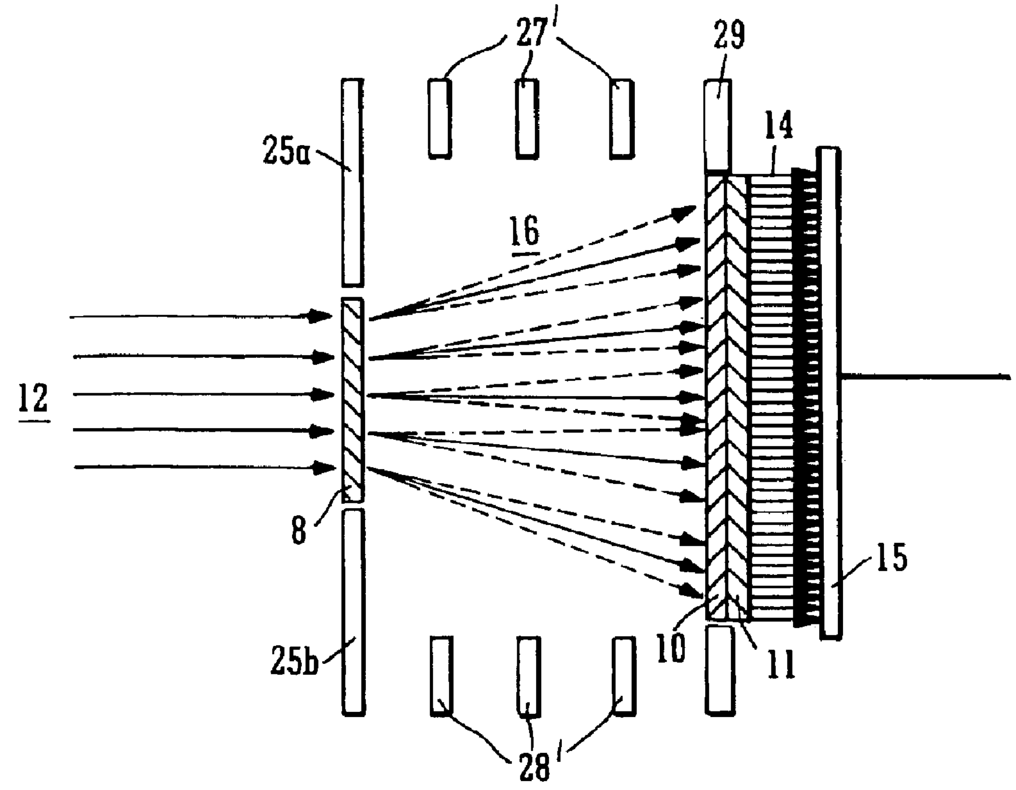
Figure 11B:
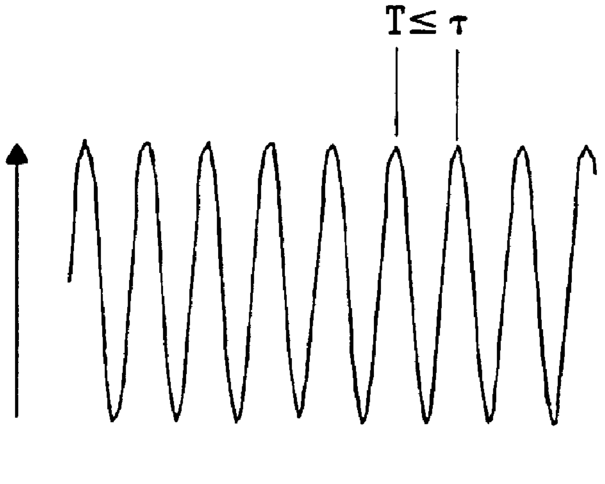
Figure 12:
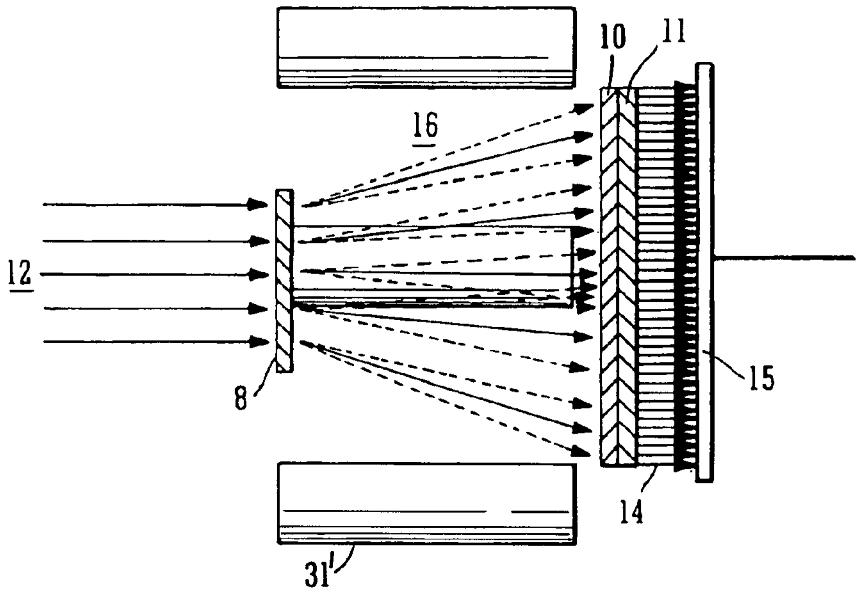
Figure 13A:
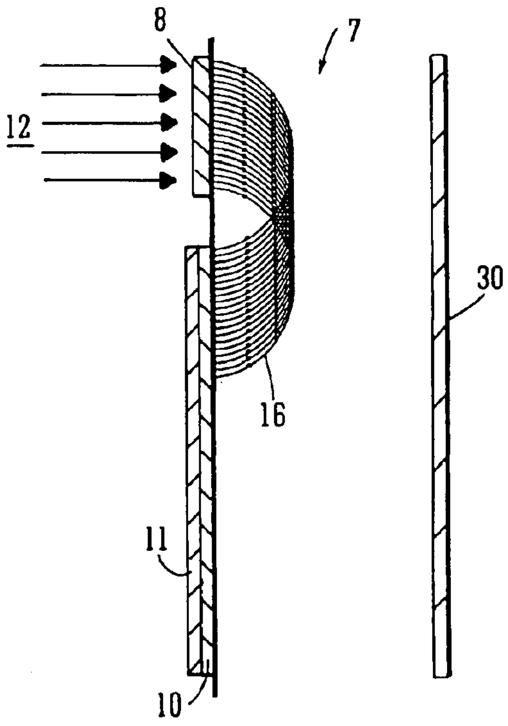
Figure 13B:
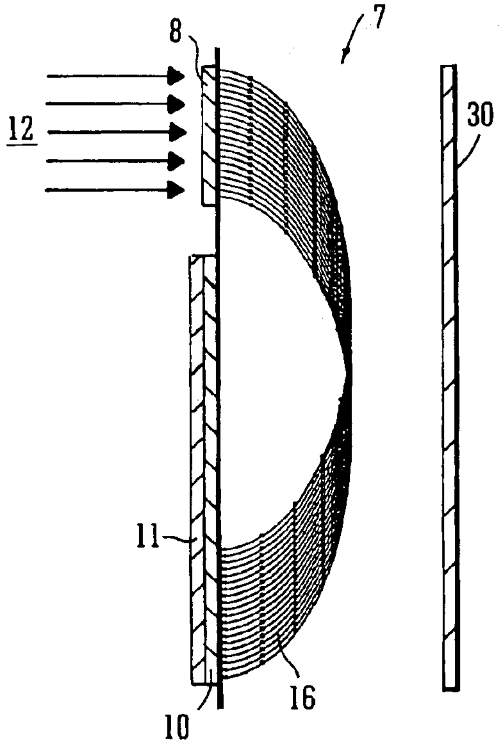
Figure 14A:
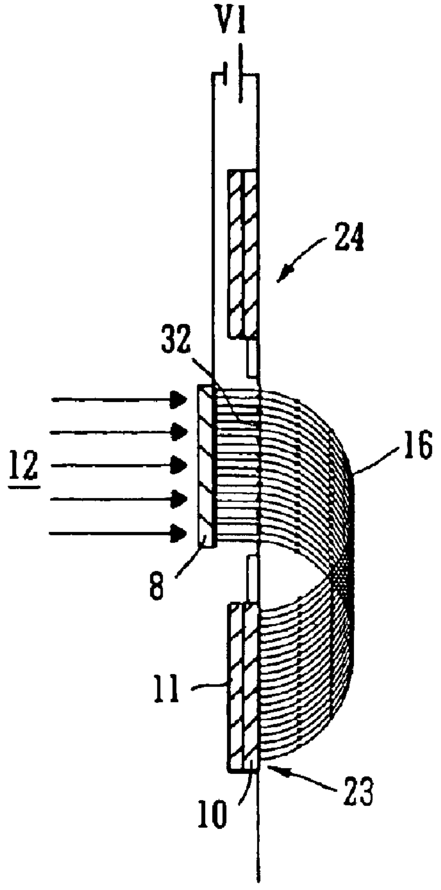
Figure 14B:
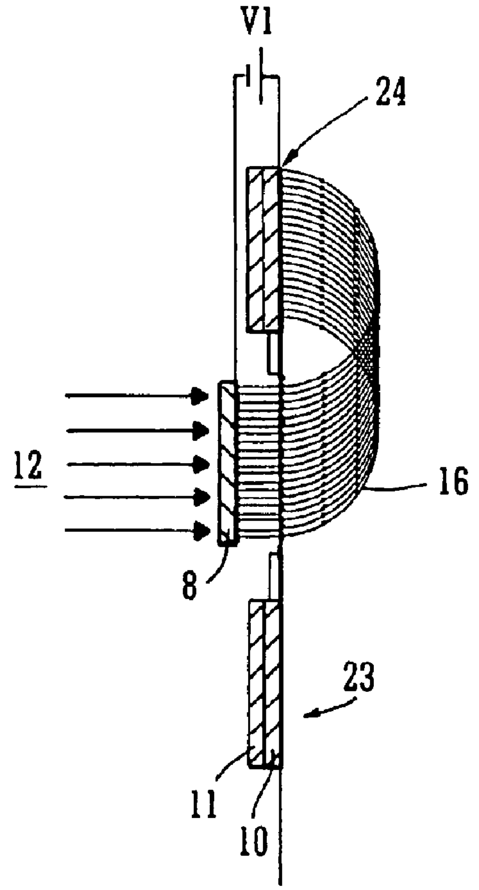

FIG. 9A shows a SIMION model of the trajectories of secondary electrons according to a second main embodiment of the present invention wherein the secondary electrons emitted from a first microchannel plate are guided onto just a portion of a relatively large microchannel plate at a first time and FIG. 9B shows the secondary electrons being guided onto a second different portion of the microchannel plate at a second later time;

FIG. 10A shows a schematic of an embodiment wherein secondary electrons emitted from a first microchannel plate are rotated over the input surface of a relatively large microchannel plate by a quadrupole lens arrangement, and FIG. 10B shows the sweeping motion of the beam of secondary electrons across the surface of the microchannel plate detector;

FIG. 11A shows an embodiment wherein secondary electrons released from different channels of a first microchannel plate are guided by an electrostatic lens or electrode arrangement onto substantially non-overlapping areas of a relatively large microchannel plate in a time varying manner and FIG. 11B shows an exemplary AC voltage which may be applied to the electrostatic lens or electrode arrangement in order to move the secondary electrons across the surface of the microchannel plate detector;

FIG. 12 shows an embodiment wherein a multipole rod set lens arrangement is used to move the secondary electrons across the surface of a microchannel plate detector in a time varying manner;

FIG. 13A shows a SIMION model of the trajectories of secondary electrons in an embodiment wherein the secondary electrons are guided onto a first region of a co-planar microchannel plate detector at a first time by the combination of an electric and a magnetic field and FIG. 13B shows the trajectories of the secondary electrons at a second later time when the electric field is reduced; and FIG. 14A shows a SIMION model of the trajectories of secondary electrons in an embodiment wherein the electrons are guided by a magnetic field in a first direction onto a co-planar chevron pair of microchannel plates at a first time and FIG. 14B shows the secondary electrons being guided by a magnetic field in a second direction opposite to the first direction onto another co-planar pair of microchannel plates at a second later time.

DETAILED DESCRIPTION

Figure 1A:
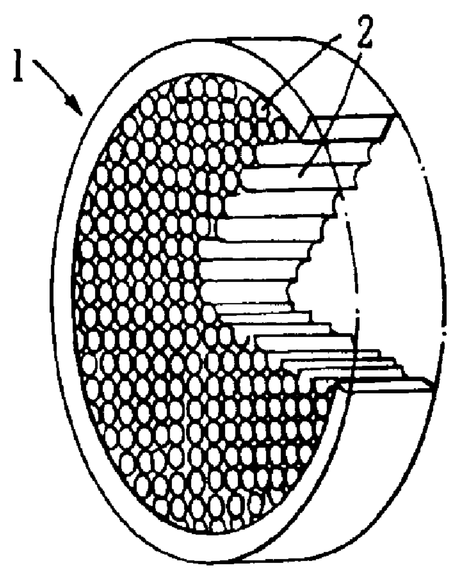
FIG. 1A PRIOR ART
FIG. 1A shows a schematic of a partial view of a conventional microchannel plate and FIG. 1B shows secondary electrons being produced within a channel of a microchannel plate detector.

A conventional microchannel plate is shown in FIG. 1A. The microchannel plate 1 comprises a periodic array of very small diameter glass capillaries or channels 2 which have been fused together and sliced into a thin plate. Microchannel plates 1 typically have several million channels 2 and each channel 2 functions as an independent electron multiplier.

Figure 1B:
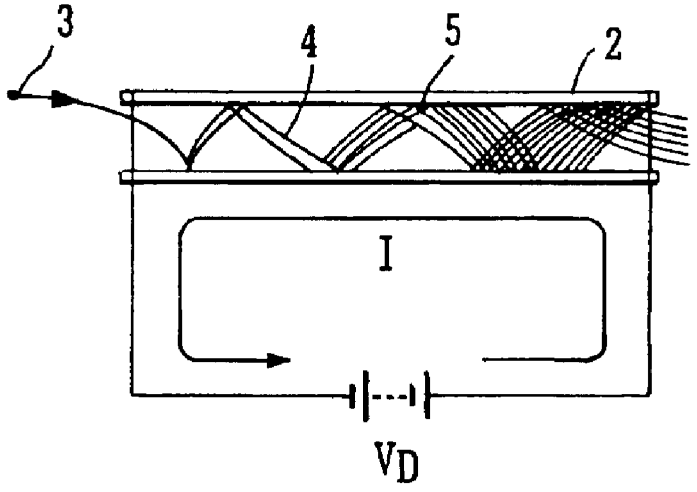
FIG. 1B PRIOR ART

FIG. 1B shows the operation of a single channel 2 of a microchannel plate 1. A single incident particle 3, e.g. an ion (or less preferably an electron or photon) enters the channel 2 and causes secondary electrons 4 to be emitted from the channel wall 5. A potential difference $V_D$ is maintained across the microchannel plate 1 which generates an electric field which acts to accelerate the secondary electrons 4 towards the output surface of the microchannel plate 1. The secondary electrons 4 travel along parabolic trajectories through the channel 2 until they strike the channel wall 5 whereupon they produce yet further secondary electrons 4. This process is repeated several times along the length of the channel 2 resulting in a cascade of secondary electrons 4 being released or emitted from the exit of the illuminated channel 2 of the microchannel plate 1. The microchannel plate 1 may be arranged to yield several thousand secondary electrons 4 at the output surface in response to a single incident particle (e.g. ion).

Figure 2:
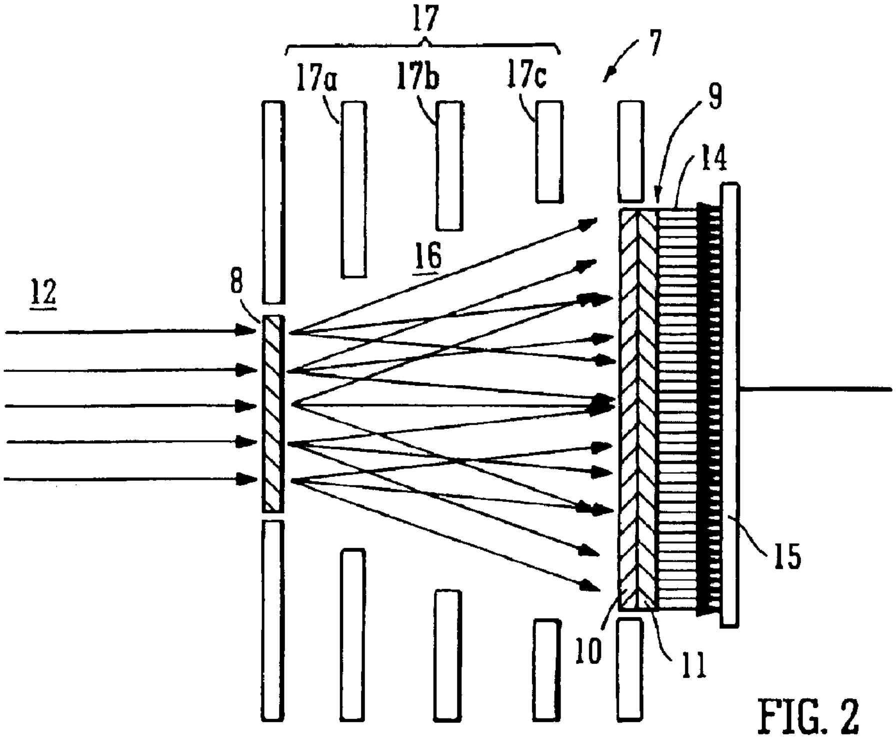
FIG. 2 shows a schematic of a first main embodiment of the present invention wherein an electrostatic lens is used to diverge secondary electrons emitted from a first microchannel plate onto a second larger microchannel plate.

A first main embodiment of the present invention will now be described with reference to FIG. 2. FIG. 2 shows a detector 7 for a mass spectrometer, preferably an ion detector, which comprises a first microchannel plate 8 upon which ions 12 (or less preferably other particles) are received or are incident upon. The first microchannel plate 8 preferably generates secondary electrons 16 which are then emitted from the first microchannel plate 8 and are preferably transmitted towards a detecting device 9 positioned behind and spaced from the first microchannel plate 8. An electrostatic lens arrangement 17 or arrangement of one or more electrodes (or less preferably one or more magnetic lenses) is preferably positioned between the first microchannel plate 8 and the detecting device 9. The detecting device 9 preferably comprises a pair of microchannel plates 10,11 arranged in a chevron arrangement such that the channels within the two microchannel plates 10,11 are at an angle with respect to the interface between the two microchannel plates 10,11. A collector plate 15 is preferably arranged behind the rearmost of the two microchannel plates 11 forming the detecting device 9.

The first microchannel plate 8 is preferably a single microchannel plate run at a relatively low gain, for example between ×5 and ×20, the chevron pair of microchannel, plates 10,11 are preferably run at a relatively high gain of $\times10^6$. The ion detector 7 therefore preferably has an overall gain of between $5\times10^6$ and $2\times10^7$.

In a preferred embodiment at least one, preferably at least two, three, four, five, six, seven, eight, nine or ten electrostatic lenses or electrodes 17*a*, 17*b*, 17*c* are arranged between the first microchannel plate 8 and the chevron pair of microchannel plates 10,11. In one embodiment the electrostatic lenses may comprise cylindrically symmetrical electrodes. Other electrode arrangements are also contemplated. The electrostatic lenses preferably serve to focus, diverge or guide secondary electrons 16 released from the first microchannel plate 8 onto the desired portion or area of the detecting surface of the detecting device 9. According to the first main embodiment secondary electrons 16 are preferably diverged onto and across substantially the whole of the detecting surface of the detecting device 9 (i.e. microchannel plates 10,11).

In operation ions 12 emerging from, for example, the drift or flight region of a Time of Flight mass analyser are preferably incident upon an input surface of the first microchannel plate 8. The first microchannel plate 8 generates secondary electrons 16 in response to an ion arrival (or less preferably to the arrival of a photon or electron). The number of secondary electrons 16 produced by the first microchannel plate 8 per ion impact preferably approximates to a Poisson distribution. The secondary electrons 16 generated by the first microchannel plate 8 are then preferably released from an exit surface of the first microchannel plate 8 and are preferably accelerated towards the detecting device 9 (e.g. a chevron pair of microchannel plates 10,11) by a potential difference maintained between the output surface of the first microchannel plate 8 and the input surface of the detecting device 9.

The secondary electrons 16 exit the first microchannel plate 8 with an angular distribution related to the bias voltage across the first microchannel plate 8 and the field gradient between the exit surface of the first microchannel plate 8 and the input surface of the second microchannel plate 10 forming the front end of the detecting device 9. The secondary electrons 16 are preferably not focussed onto the second microchannel plate 10 but are preferably spread or diverged substantially evenly across the input or detecting surface of the second microchannel plate 10. This ensures that repetitive primary ion events at the first microchannel plate 8 generate secondary electrons 16 which are distributed over a relatively large area of the second microchannel plate 10.

At least some, preferably substantially all, of the secondary electrons 16 are preferably received by the input surface of the second microchannel plate 10 and tertiary electrons 14 are preferably generated by the chevron pair of microchannel plates 10,11 in response thereto. The tertiary electrons 14 are preferably emitted from the exit surface of the third microchannel plate 11 and may be received and detected by a collector plate 15 arranged behind the third microchannel plate 11.

Dispersing the secondary electrons 16 released from the first microchannel plate 8 over a second larger microchannel plate 10 advantageously allows the input ion current to be increased by the ratio of the area of the second microchannel plate 10 to the area of the first microchannel plate 8 without compromising the gain of the ion detector 7.

Figure 3:
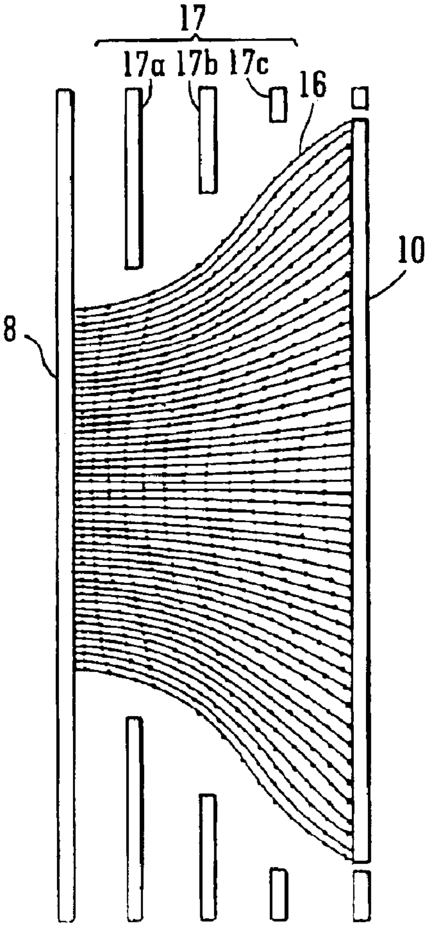
FIG. 3 shows a SIMION model of the trajectories of secondary electrons as they exit the first microchannel plate and are diverged on to the second relatively larger microchannel plate according to the first main embodiment of the present invention.

FIG. 3 shows a two-dimensional SIMION simulation showing the trajectories of secondary electrons 16 emitted from the first microchannel plate 8 as they are accelerated towards the second microchannel plate 10 of the ion detector 7. An electrostatic lens or electrode arrangement 17 is shown arranged between the first microchannel plate 8 and second microchannel plate 10 to disperse the secondary electrons 16 over the detecting surface of the second microchannel plate 10. The SIMION simulation represents electron trajectories 16 for secondary electrons exiting the first microchannel plate 8 at an angle normal to the surface of the first microchannel plate 8 and having an initial energy of 20 eV. In this simulation the input surface of the second microchannel plate 10 was maintained at a potential +105 V higher than the output surface of the first microchannel plate 8. The output surface of the first microchannel plate 8 may, for example, be maintained at 0 V and emit secondary electrons 16 from a substantially circular exit surface having a diameter of 25 mm. The second microchannel plate 10 preferably receives at least some, preferably all, of the secondary electrons 16 over a substantially circular detecting surface having, for example, a larger diameter of 50 mm. The first microchannel plate 8 and the second microchannel plate 10 may according to one embodiment be spaced 20 mm apart. According to other embodiments a different spacing between the first microchannel plate 8 and the second microchannel plate may be employed.

The first 17*a*, second 17*b* and third 17*c* electrodes of the electrostatic lens 17 arranged between the first microchannel plate 8 and the second microchannel plate 10 were in the simulation shown in FIG. 3 maintained at potentials of +100 V, +500 V and +0 V respectively higher than the potential of the output surface of the first microchannel plate 8.

The electrodes 17*a*,17*b*,17*c* of the electrostatic lens 17 are preferably ring electrodes and have annulae which preferably increase in diameter in a direction towards the second microchannel plate 10. Secondary electrons preferably pass through each of the ring electrodes 17*a*,17*b*,17*c* of the electrostatic lens 17 and are preferably dispersed across the larger input surface of the second microchannel plate 10.

The electrostatic lens 17 or electrode arrangement preferably provides point to point imaging for secondary electrons 16 exiting the first microchannel plate 8 at an angle normal to its exit surface and having the same initial energy. However, the electrostatic lens 17 does not provide point to point imaging for secondary electrons 16 exiting the first microchannel plate 8 at angles which are not normal to the exit surface of the microchannel plate 8 or for secondary electrons 16 having a range of energies.

Markers are shown on each of the electron trajectories 16 in FIG. 3 (and subsequent simulations) which correspond to the position of the secondary electrons 16 at sequential time intervals of 0.25 ns. As can be seen from FIG. 3 secondary electrons 16 having trajectories which are closer to the electrodes 17*a*,17*b*,17*c* of the electrostatic lens 17 arrive at the second microchannel plate 10 before secondary electrons travelling further from the electrodes 17*a*,17*b*,17*c* (i.e. travelling within a central region between the first and second microchannel plates 8,10). Therefore, as can be seen from FIG. 3 a small time spread is introduced in the arrival times of secondary electrons 16 at the second microchannel plate 10 for electrons generated by the first microchannel plate 8 in response to simultaneous ion arrivals. In this simulation it can be seen that the time spread introduced in the arrival times of the secondary electrons 16 is of the order of one marker i.e. of the order of 0.25 ns. This time spread can be corrected for, if desired, by preferably appropriately shaping the collector plate 15 and/or by providing a further electrostatic element between the first and second microchannel plates 8,10.

Although only displayed in two dimensions the SIMION simulation shown in FIG. 3 shows electron trajectories 16 for a three-dimensional assembly having a cylindrical symmetry. In a preferred embodiment a collector plate 15 is positioned downstream of the final electron multiplier element 11 (i.e. the third microchannel plate 11) and may be shaped to compensate for the time spread in the arrival times of secondary electrons. It will be appreciated that the shape, size, number and potentials applied to the electrodes 17*a*, 17*b*,17*c* of the electrostatic lens 17 may be varied and are not limited to the illustrative arrangements described above and shown in the drawings.

Figure 4:
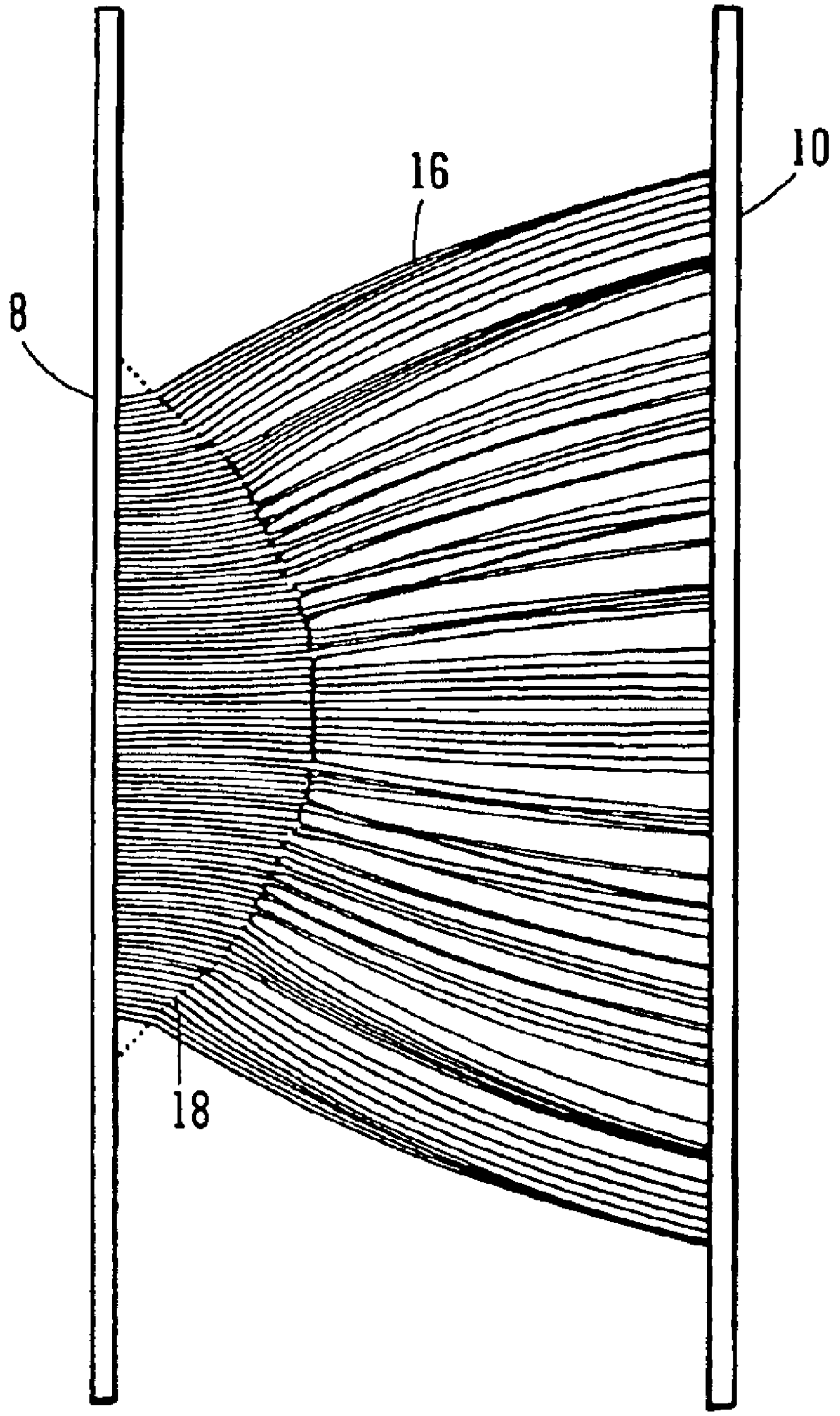
FIG. 4 shows a SIMION model of the trajectories of the secondary electrons in an embodiment wherein a grid electrode is used to diverge the secondary electrons.

FIG. 4 shows a SIMION simulation of the trajectories of secondary electrons 16 in an embodiment wherein a grid electrode 18 is arranged between the exit surface of the first microchannel plate 8 and an input or detecting surface of the second microchannel plate 10 in order to disperse the secondary electrons 16 over the input surface of the second microchannel plate 10. The grid electrode 18 may preferably be substantially non-planar and may preferably be curved or dome shaped.

A potential difference may be maintained between the output surface of the first microchannel plate 8 and the grid electrode 18 so that secondary electrons 16 are accelerated towards the grid electrode 18. In this simulation the input surface of the second microchannel plate 10 was maintained at a potential of +1000 V higher than the output surface of the first microchannel plate 8. The output surface of the first microchannel plate 8 may be maintained at 0 V and release secondary electrons 16 from a substantially circular exit surface having a diameter of 25 mm. The second microchannel plate 10 may preferably be spaced a distance of 30 mm from the first microchannel plate 8 and preferably receives secondary electrons 16 over a substantially circular area having a diameter of 40 mm.

According to other embodiments the secondary electrons 16 emitted from the first microchannel plate 8 may be distributed over two or more detectors. The two or more detectors preferably comprise microchannel plates. Distributing the secondary electrons 16 over two or more detectors results in an increased number of channels being available for electron multiplication and hence increases the dynamic range of the ion detector 7. In such embodiments the outputs of the final multiplication stages may be directed to the same recording device or to separate recording devices. The outputs of the two or more detectors may preferably be directed to a combination of Analogue to Digital and Time to Digital recording devices so that the dynamic range of the ion detector 7 is increased.

According to an embodiment the secondary electrons 16 released from the first microchannel plate 8 may be divided, equally or unequally into two or more portions or streams of electrons and may be directed to the input surfaces of the two or more detectors. The two or more detectors may comprise microchannel plates, electron multiplier tubes, photomultiplier tubes or any combination of detectors. Distributing the secondary electron current between two or more detectors allows a higher overall ion arrival rate at the first microchannel plate to be accomodated without loss of gain due to detector saturation.

Figure 5:
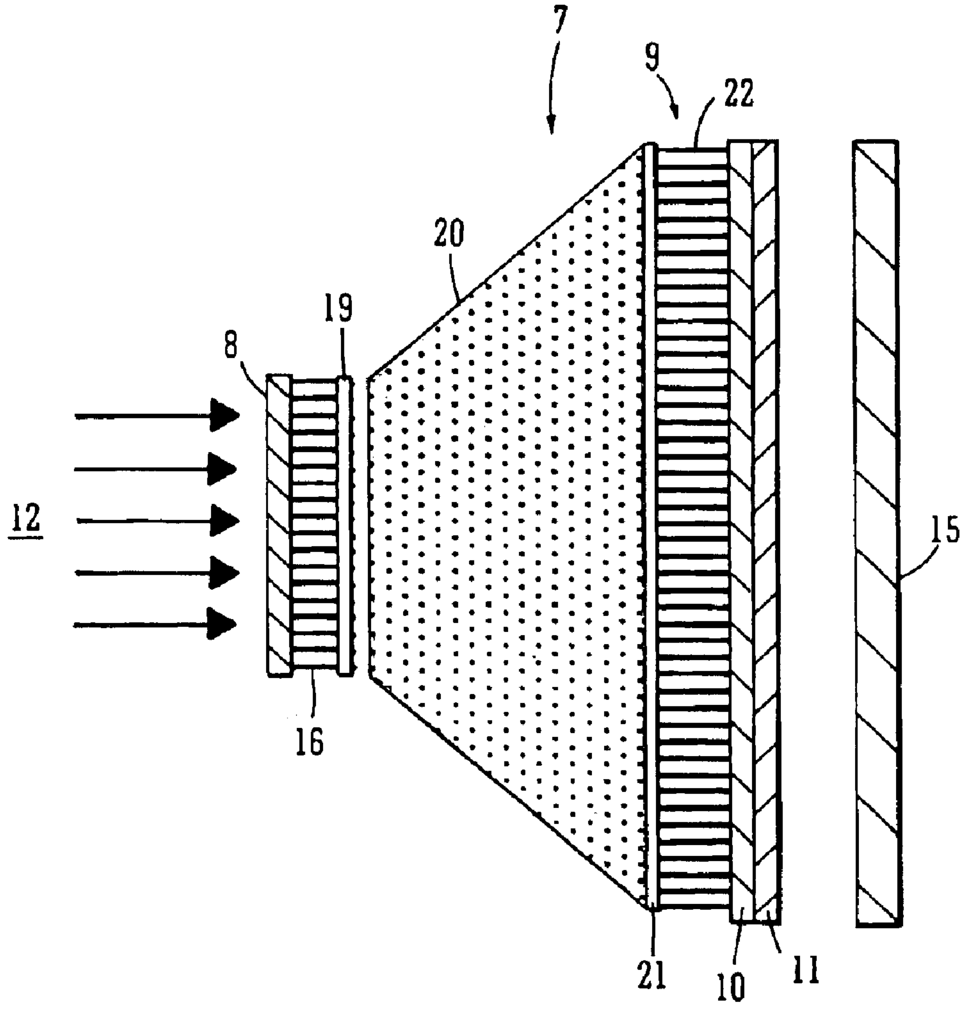
FIG. 5 shows a schematic of an embodiment wherein the secondary electrons emitted from the first microchannel plate impinge upon a scintillator and resulting photons from the scintillator are diverged onto a relatively larger photocathode arranged in front of a second microchannel plate.

FIG. 5 shows another embodiment in which at least some, preferably all, of the secondary electrons 16 emitted by the first microchannel plate 8 are arranged to strike an organic or inorganic scintillator 19 arranged between the first microchannel plate 8 and the second microchannel plate 10. The arrival of secondary electrons 16 at the scintillator 19 results in photons: 20 being generated by the scintillator 19. The photons 20 emitted by the scintillator 19 are preferably directed by a non-focusing light guide (not shown) towards a photo-cathode window 21 which preferably has a greater area than the emitting area of the scintillator 19 from which the photons 20 were emitted. The photo-cathode 21 preferably also has a larger area than the first microchannel plate 8.

The scintillator 19 is preferably an organic or plastic scintillator since typical rise and decay times are of the order of 0.5–2 ns. The photo-cathode 21 preferably receives at least some of the photons 20 emitted from the scintillator 19 and generates electrons 22 in response to photon arrivals. The photo-cathode 21 preferably comprises a Gallium-Arsenide photo-cathode.

The electrons 22 generated or emitted by the photo-cathode 21 are then preferably directed onto the entrance surface of a second microchannel plate 10. The second microchannel plate 10 preferably has an input surface area which is greater than the output surface area of the first microchannel plate 8 and/or scintillator 19. It is also contemplated (although not shown in FIG. 5) that the input surface of the second microchannel plate 10 could be larger than the output surface of the photo-cathode 21, i.e. electrons released from the photo-cathode 21 could also be diverged onto the second microchannel plate 10. The second microchannel plate 10 preferably forms one of a chevron pair of microchannel plates 10,11 which acts as an electron multiplier and releases electrons to be received and detected at a collector plate 15.

In another preferred embodiment the photons 20 released by the scintillator 19 may be directed towards multiple photo-cathodes having a combined input or receiving area which is preferably larger than that of the scintillator 19 and/or first microchannel plate 8.

In another embodiment, the photo-cathode 21 may not be provided and the photons from the scintillator 19 may be received directly on second microchannel plate 10 of the detector 9. In this embodiment the photons released by the scintillator 19 are preferably UV photons.

An advantage of this embodiment is that the output of the ion detector 7 can be electrically decoupled from other components of the mass spectrometer upstream of detector 9. This is particularly advantageous in embodiments wherein the component upstream of the detector is the drift or flight region of a Time of Flight mass spectrometer. For example, in a preferred embodiment the collector plate 15 of the ion detector 7 can be held at virtual ground potential thus isolating the output signal from power supply noise and switching voltages. This configuration not only reduces electronic noise but also considerably simplifies the output signal amplification requirements.

Figure 6:
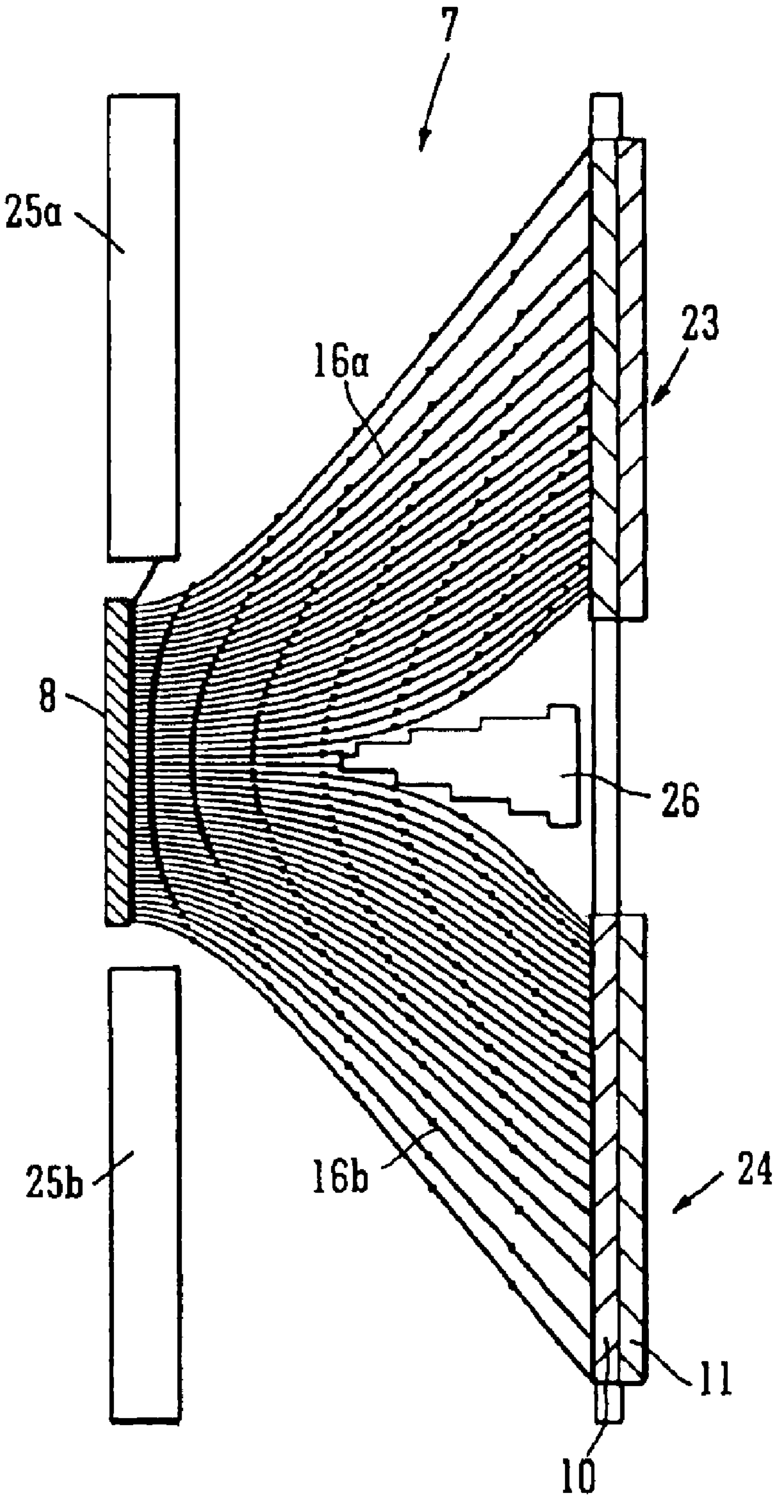
FIG. 6 shows a SIMION model of the trajectories of secondary electrons according to another embodiment wherein an electrode is provided to divide secondary electrons into two separate streams of electrons.

FIG. 6 shows a two dimensional SIMION simulation showing the trajectories of secondary electrons 16 for an embodiment wherein a dividing electrode 26 is provided to divide the secondary electrons 16 emitted from the first microchannel plate 8 such that one portion or stream of secondary electrons 16*a* is received by a first detector 23 and another portion or stream of secondary electrons 16*b* is received by a second detector 24.

In the simulation shown in FIG. 6 the secondary electrons 16 exit the first microchannel plate 8 at an angle normal to the plane of the first microchannel plate 8 and with an initial energy of 20 eV. In this simulation the dividing electrode 26 was maintained at a potential of +300 V and the input surfaces of the two detectors 23,24 were maintained at a potential of +1000 V with respect to the output surface of the first microchannel plate 8. The spacing between the first microchannel plate 8 and the plane in which the detectors 23,24 are arranged was 31 mm. The first microchannel plate 8 releases secondary electrons 16 from a preferably substantially circular area preferably having a diameter of 25 mm. The markers on each electron trajectory 16*a*,16*b* correspond to the position of the secondary electrons at sequential 0.5 ns time intervals.

In this embodiment the secondary electrons are split into two substantially equal portions or streams 16*a*,16*b* which are then directed to the input surfaces of the two detectors 23,24. The detectors 23,24 are preferably arranged in the same plane and are preferably spaced apart from each other to receive at least some of the secondary electrons released from the first microchannel plate 8.

The combined area of the input surfaces of the two detectors 23,24 is preferably greater than the area of the first microchannel plate 8 which releases the secondary electrons that are received by the two detectors 23,24. The detectors 23,24 preferably each comprise a chevron pair of microchannel plates 10,11. The dividing electrode 26 is preferably arranged or located between the two detectors 23,24 and preferably extends towards the centre of the exit surface of the first microchannel plate 8. One or more further electrodes 25*a*,25*b* may be provided in the same plane as the first microchannel plate 8. The one or more electrodes 25*a*,25*b* may be ring electrode(s) which surround the microchannel plate 8 or the one or more electrodes 25*a*,25*b* may comprise separate discrete electrodes. The one or more further electrodes 25*a*,25*b* are preferably maintained at a lower voltage with respect to the detectors 23,24 and are preferably maintained at the same voltage as the first microchannel plate 8.

Figure 7:
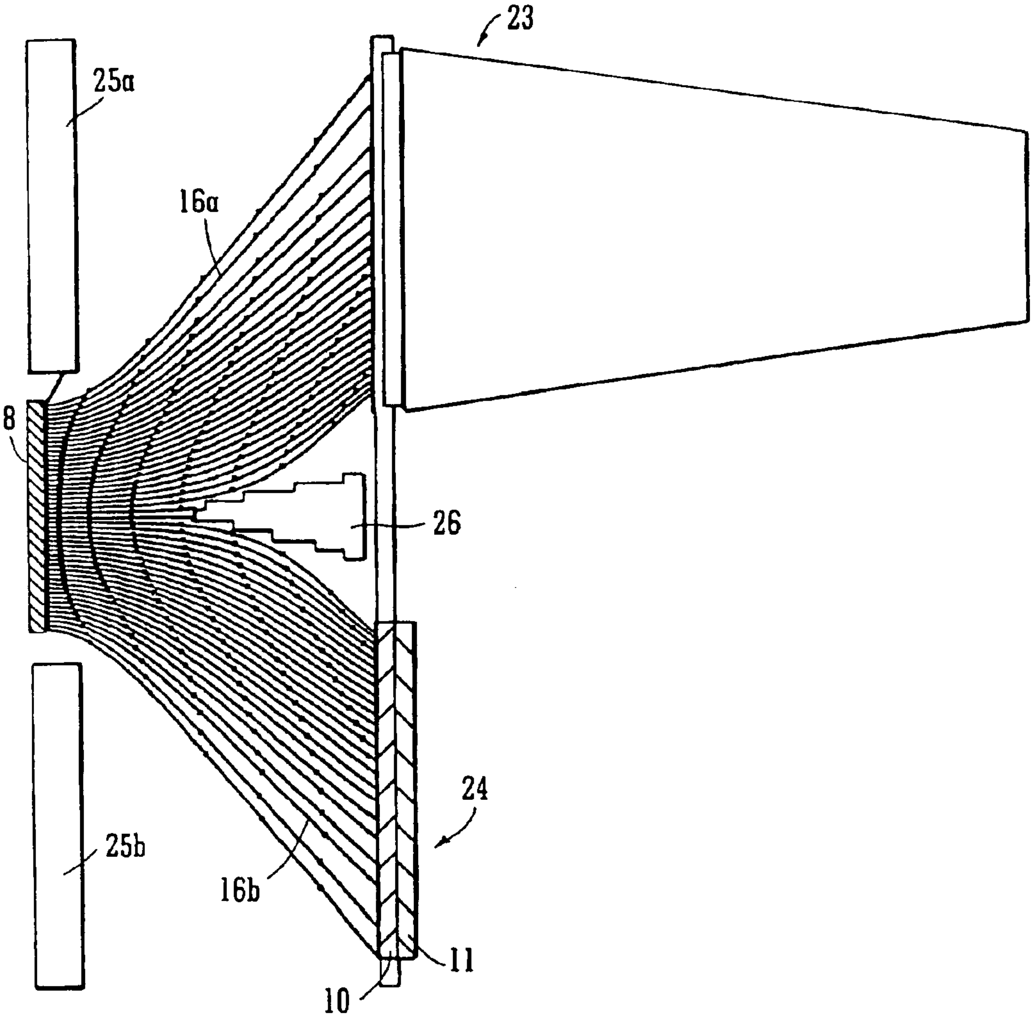
FIG. 7 shows a SIMION model of the trajectories of the secondary electrons according to an embodiment similar to that shown in FIG. 6 wherein a photomultiplier tube is used to detect one of the streams of secondary electrons rather than a microchannel plate.

FIG. 7 shows a two-dimensional SIMION simulation showing trajectories of secondary electrons 16*a*,16*b* for an embodiment similar to that in FIG. 6 except that whilst one of the detectors 24 comprises a chevron pair of microchannel plates 10,11 the other detector 23 comprises a scintillator and photo-multiplier tube.

Figure 8:
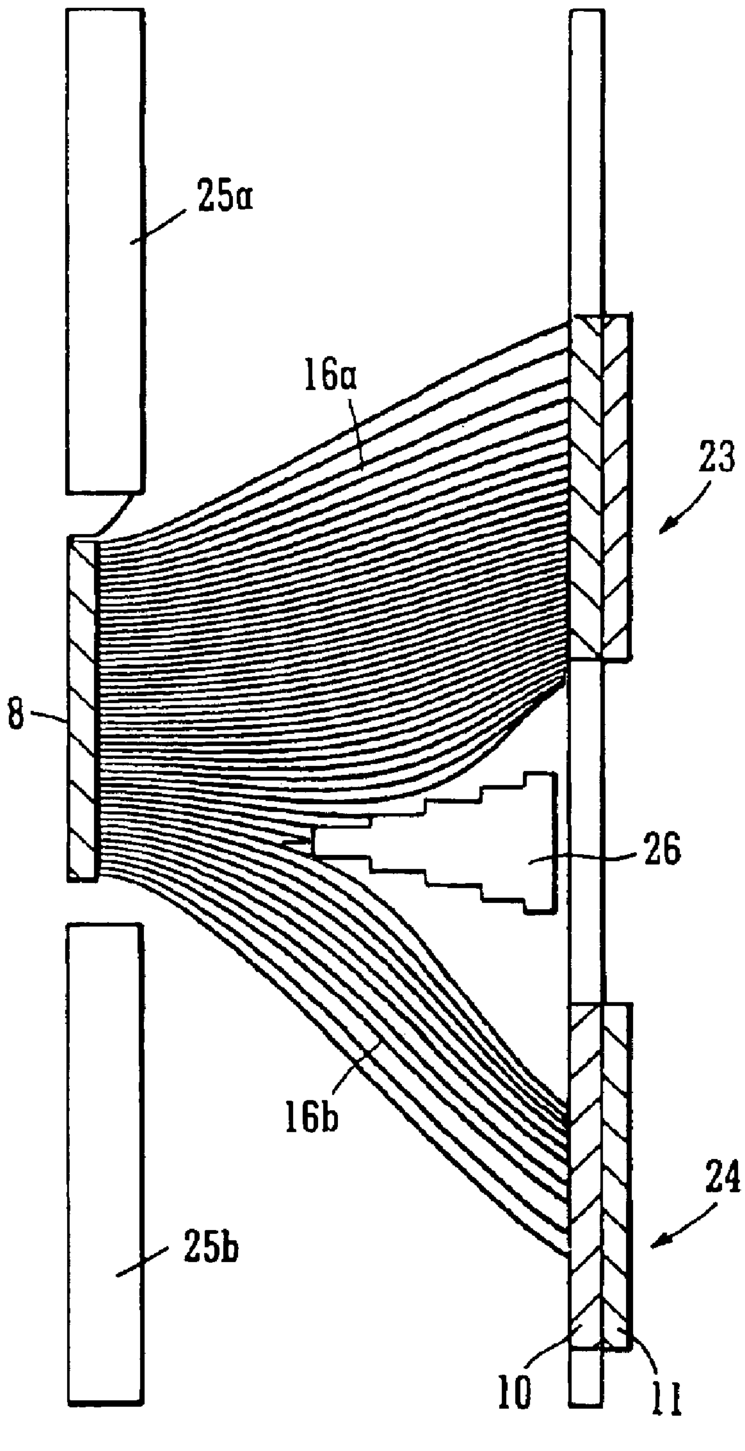
FIG. 8 shows a SIMION model of the trajectories of secondary electrons according to an embodiment wherein the secondary electrons are divided into two unequal streams of secondary electrons.

FIG. 8 shows a two-dimensional SIMION simulation showing the trajectories of secondary electrons 16*a*,16*b* for an embodiment similar to that shown in FIG. 6 except that in this embodiment the secondary electrons are split unequally between the two detectors 23,24 by the dividing electrode 26. In this simulation the dividing electrode 26 is located off-centre with respect to the centre of the first microchannel plate 8. The dividing electrode is preferably maintained at a potential +200 V higher than the output surface of the first microchannel plate 8 which may be maintained at 0 V. In this embodiment the electrode 26 is arranged off-centre with respect to exit surface of the first microchannel plate 8 so that approximately 75% of the secondary electrons emitted from the first microchannel plate 8 are directed towards the input surface of the first detector 23 and 25% of the secondary electrons emitted from the first microchannel plate 8 are directed towards the input surface of the second detector 24. This embodiment allows two different types of detection electronics to be used with the two preferably separate detectors 23,24. The dividing electrode 26 may be arranged further or less off-centre with respect to the exit surface of the first microchannel plate 8 so that the secondary electrons are directed onto the two detectors 23,24 in any desired ratio.

A second main embodiment of the present invention will now be described wherein ions 12 (or other particles) are converted to secondary electrons 16 using a first microchannel plate 8 operated at low gain. The secondary electrons 16 emitted by the first microchannel plate 8 are then directed, deflected or otherwise guided onto a specific portion, region or area of a detecting device 9 having an input area which is preferably larger than the output surface of the first microchannel plate 8. The portion, region or area of the detecting device 9 onto which the secondary electrons 16 are guided at any one time is preferably smaller than (i.e. only a fraction of) the total detecting area or surface of the detecting device 9 and may be smaller than the total area of the first microchannel plate 8.

The secondary electrons 16 may be continuously swept, moved or rotated (or alternatively periodically switched, swept, moved or rotated in a preferably stepwise manner) over, across or around the surface of the detecting device 9 so that the average number of secondary electrons 16, per unit time, incident on any one area, portion or region of the detector 9 is less than the average number of secondary electrons 16 emitted from an area of equivalent size on the first microchannel plate 8.

In a preferred embodiment the relatively large detecting device 9 comprises a second microchannel plate 10 and optionally a third microchannel plate preferably arranged in a chevron pair with the second microchannel plate 10. In this embodiment the secondary electrons 16 generated by the first microchannel plate 8 for a single ion arrival are focused or directed onto the second microchannel plate 10 so that the secondary electrons 16 are incident on the minimum number of channels 2 of the second microchannel plate 10 as possible. This focusing of the secondary electrons 16 enables a narrow pulse height distribution to be maintained.

According to the second main embodiment the preferred ion detector 7 may comprise a first microchannel plate 8 of area $A_1$ and a second microchannel plate 10 of larger area $A_2$ and in which both microchannel plates 8,10 preferably have identical channel diameter and length. An electrostatic lens system or electrode arrangement is preferably arranged between the first 8 and second 10 microchannel plates and is preferably arranged to focus, direct or guide the secondary electrons 16 onto discrete areas of the input surface of the second microchannel plate 10. In this embodiment the maximum average output current of the ion detector 7 before saturation occurs will be increased by the ratio $A_2/A_1$ compared to the maximum average output current of a single ion detector of area $A_1$. Preferably, the time taken to sweep, move, guide or direct the secondary electron beam over the whole of the area $A_2$ of the second microchannel plate 10 is less than or equal to the time constant of recovery of an individual channel 2 after illumination.

FIGS. 9A and 9B show two-dimensional SIMION simulations illustrating the trajectories of secondary electrons 16 emitted from a first microchannel plate 8 and which are accelerated towards a rearward second microchannel plate 10 at a first time $t_1$ (FIG. 9A) and a second later time $t_2$ (FIG. 9B). In this embodiment an electrostatic lens or electrode arrangement 27,28 is provided between the first microchannel plate 8 and the second microchannel plate 10 to direct the secondary electrons 16 onto specific portions, regions or discrete areas of the second microchannel plate 10. The electrostatic lens 27,28 preferably comprises two or more electrodes 27,28 arranged between the first microchannel plate 8 and the second microchannel plate 10. The two or more electrodes 27,28 are preferably arranged on opposite sides between the two microchannel plates 8,10. The separation between the electrodes 27,28 preferably increases in a direction from the first microchannel plate 8 towards the second microchannel plate 10. When secondary electrons 16 are being directed onto a portion, region or area of the second microchannel plate 10 preferably one or more portions, regions or areas of the second microchannel plate 10 are substantially free of incident secondary electrons 16 thereby allowing that portion, region or area of the microchannel plate 10 time to recover and for the individual channels 2 to replenish with electrons.

FIG. 9A shows a SIMION simulation of the trajectories of secondary electrons 16 emitted from the first microchannel plate 8 at a first time $t_1$. At the first time $t_1$ a first electrode 27 is maintained at a potential which is preferably higher than the output surface of the first microchannel plate 8 and which is also preferably lower than the input surface of the second microchannel plate 10. At the same first time $t_1$ a second electrode 28 is preferably maintained at a potential which is preferably lower than the first electrode 27 and which is also preferably lower than the potential of the output surface of the first microchannel plate 8.

The voltages applied to the first microchannel plate 8, the second microchannel plate 10 and the two intermediate electrodes 27,28 at the first time $t_1$ are preferably such as to direct or guide secondary electrons 16 emitted from the first microchannel plate 8 on to a first portion, region or area of the second microchannel plate 10. Preferably, one or more further electrodes **25*a*,25*b* may be provided which are preferably substantially co-planar with the first microchannel plate 8. These one or more further electrodes 25*a*,25*b* may preferably be held at substantially the same potential as the output surface of the first microchannel plate 8 although less preferably these one ore more further electrodes 25*a*, 25*b* may be maintained at a different potential. Similarly, other one or more further electrodes 29*a*,29*b* may be provided which are preferably substantially co-planar with the second microchannel plate 10. These other one or more further electrodes 29*a*,29*b* may preferably be held at substantially the same potential as the input surface of the second microchannel plate 10 although less preferably these other one or more further electrodes 29*a*,29*b*** may be maintained at a different potential.

According to a particularly preferred embodiment the potentials applied to the electrodes of the electrostatic lens 27,28 are preferably varied with time such that the electric field between the first 8 and second 10 microchannel plates directs or guides the secondary electrons 16 emitted from the first microchannel plate 8 onto different portions, regions or areas of the second microchannel plate 10 at different times. For example, the beam of secondary electrons 16 emitted from the first microchannel plate 8 may be switched regularly and/or repetitively between two, three, four, five, six, seven, eight, nine, ten or more than ten different portions, regions or areas of the second microchannel plate 10. The beam of secondary electrons 16 may alternatively be continuously scanned or stepwise shifted, moved or rotated across the second microchannel plate 10 in an analogous manner.

In the particular illustrative simulations shown in FIGS. 9A and 9B the second microchannel plate 10 is spaced 32 mm from the first microchannel plate 8 and is maintained at a potential +1000 V higher than the output surface of the first microchannel plate 8. The first microchannel plate 8 may be maintained at 0 V and emits secondary electrons 16 from a preferably substantially circular area preferably having a diameter of 25 mm. The second microchannel plate 10 preferably has a detecting surface for receiving the secondary electrons 16 which is preferably substantially circular and which preferably has a diameter of 50 mm.

At the first time $t_1$ the lens electrodes 27,28 are preferably maintained at potentials of 900 V and −100 V with respect to the output surface of the first microchannel plate 8. In this simulation the secondary electron trajectories 16 are shown for secondary electrons 16 exiting the first microchannel plate 8 and are at an angle normal to the plane of the first microchannel plate 8. The secondary electrons 16 have an initial energy of 20 eV. The markers on each electron trajectory 16 correspond to the positions of the secondary electrons 16 at sequential 1 ns time intervals.

FIG. 9B shows the secondary electron trajectories 16 at a second later time $t_2$. At this second later time $t_2$ the potentials applied to the lens electrodes 27,28 have been reversed such that the secondary electrons 16 are directed onto a second different area, region or portion of the input surface of the second microchannel plate 10. This enables the area of the second microchannel plate 10 which was illuminated by the secondary electrons 16 at the first time $t_1$ to recover such that saturation of the detection system does not affect the gain of the ion detector 7.

FIG. 10A shows a yet further embodiment wherein a quadrupole rod set 31 is utilized to focus or guide secondary electrons 16 emitted from the first microchannel plate 8 onto discrete areas of the input surface of the second microchannel plate 10 which preferably has a substantially circular receiving area. A bias voltage $V_B$ is preferably maintained between the output surface of the first microchannel plate 8 (which is also preferably circular) and the input surface of the second microchannel plate 10 such as to accelerate the secondary electrons 16 towards the second microchannel plate 10. DC voltages V1, V2, V3, V4 may be applied to each rod of the quadrupole rod set 31. The voltages applied to the rods of the quadrupole rod set 31 are preferably varied with time so that the secondary electrons 16 are scanned over or rotated across or around the input surface of the second microchannel plate 10. In this embodiment the secondary electrons 16 may preferably be scanned in a substantially circular motion over substantially the whole surface of the second microchannel plate 10. Other embodiments are contemplated wherein, for example, the electrons 16 may be moved in a substantially stepped, regular or erratic manner over the surface of the second microchannel plate 10.

FIG. 10B is a view along the axis of the quadrupole rod set 31. In this embodiment the secondary electrons 16 are directed onto a discrete area of the second microchannel plate 10 which is then preferably scanned clockwise or anti-clockwise around the input surface of the second microchannel plate 10 with time. It is contemplated that other multi-pole lenses may be utilized in this embodiment, for example, hexapole and octapole rod sets, or higher order rod sets.

FIG. 11A illustrates a further embodiment wherein lens electrodes 27',28' are arranged between the first microchannel plate 8 and the second microchannel plate 10. The first 8 and second 10 microchannel plates are preferably circular and the lens electrodes 27',28' are preferably arranged opposed to one another. The lens electrodes 27',28' preferably direct the secondary electrons 16 released from separate channels or regions of the first microchannel plate 8 onto preferably substantially separate preferably non-overlapping regions, areas or portions of the second microchannel plate 10 (or more generally detecting device 9). The secondary electrons 16 thus illuminate only a relatively small number or proportion of the total number of channels on the second larger microchannel plate 10. A dynamically varying, preferably relatively small, electric field is preferably maintained between the first 8 and second 10 microchannel plates by applying a time-varying (e.g. AC) voltage to the lens electrodes 27',28'. The electric field acts to deflect or move the secondary electrons 16 so that the secondary electrons 16 released from different channels or regions of the first microchannel plate 8 are preferably received by a plurality of substantially non-overlapping areas on the second microchannel plate 10 at a first time $t_1$ and by a second different plurality of substantially non-overlapping areas on the second microchannel plate 10 at a second later time $t_2$. This cycle is then repeated. This embodiment ensures that secondary electrons 16 resulting from subsequent ion arrivals at the first microchannel plate 8 within the recovery time of an individual channel are directed to different areas of the second microchannel plate 10. This again increases the maximum output current of the ion detector 7 before it is limited by saturation.

In another embodiment at least one of the lens electrodes 27',28' is an annular electrode. The one or more annular electrodes may be supplied with a time-varying voltage such that the electrons are diverged or focused onto the detector 9 by an amount which varies with time.

FIG. 11B shows an exemplary deflection voltage which may be applied to the lens electrodes 27',28' in order to produce the dynamically changing electric field. The voltage is represented as a sinusoidal wave having a frequency of more than or equal to 1/T, where T is less than or equal to the recovery time $\tau$ of an individual channel of the microchannel plate 8.

In another embodiment, the deflection voltage which may be applied to the lens electrodes 27',28' in order to produce the dynamically changing electric field is intermittently applied. The rate or frequency at which the voltage is applied to the lens electrodes is preferably selected to ensure that secondary electrons 16 resulting from subsequent ion arrivals at the first microchannel plate 8 within the recovery time of an individual channel are directed to different areas of the second microchannel plate 10.

FIG. 12 shows another embodiment similar to the embodiment shown in FIG. 11A except that a quadrupole rod set 31' is used to focus and guide the secondary electrons 16 from the exit surface of the first microchannel plate 8 to the input of the second microchannel plate 10. In this embodiment small, dynamically changing voltages may be applied to the rods of a quadrupole rod set 31' which is arranged between the first microchannel plate 8 and second microchannel plate 10. This embodiment ensures that secondary electrons 16 resulting from subsequent ion arrivals at the first microchannel plate 8 do not lead to secondary electrons 16 being directed to the same channels or regions of the second microchannel plate 10 within the recovery time of an individual channel.

Although secondary electrons 16 released from the output surface of the first microchannel plate 8 may have a relatively low susceptibility to magnetic fields, nonetheless further embodiments are contemplated wherein magnetic fields or combinations of magnetic and electrostatic fields are used to focus, guide or direct secondary electrons 16 emitted from the exit surface of the first microchannel plate 8 to the input surface of a second microchannel plate 10 or multiple microchannel plates having a combined larger surface area.

FIGS. 13A and 13B show a SIMION simulation of the trajectories of secondary electrons 16 in an embodiment in which both electrostatic and magnetic fields are used to guide secondary electrons 16 from the exit surface of the first microchannel plate 8 onto the input surface of a second larger microchannel plate 10. In this embodiment the first 8 and second 10 microchannel plates are preferably arranged substantially co-planar. An acceleration plate or reflecting electrode 30 is preferably provided spaced from both the exit surface of the first microchannel plate 8 and the input surface of the second microchannel plate 10. A uniform magnetic field having a direction substantially parallel to the surfaces of the first 8 and second 10 microchannel plates 10 is preferably provided. The magnetic field causes the secondary electrons 16 emitted from the first microchannel plate 8 to be accelerated in a substantially circular direction from the exit surface of the first microchannel plate 8 towards the input surface of the second microchannel plate 10.

According to an embodiment the magnitude and direction of the magnetic field may be maintained constant with time. However, the voltage supplied to the acceleration plate or reflecting electrode 30 may preferably be varied with time. FIG. 13A shows the trajectories of secondary electrons 16 at a first time $t_1$ when the potential difference between the first 8 and second 10 microchannel plates and the acceleration plate 30 is maintained at a potential difference such that the secondary electrons are guided onto a first area, region or portion of the input surface of the second microchannel plate 10.

As shown in FIG. 13B, at a second later time $t_2$ the potential difference between the first 8 and second 10 microchannel plates and the acceleration plate 30 is preferably reduced such that the secondary electrons 16 are guided onto a second different area, region or portion of the second microchannel plate 10. The cycle is then preferably repeated.

The potential difference between the acceleration plate or reflecting electrode 30 and the first 8 and second 10 microchannel plates may according to one embodiment be varied continuously so as to sweep or move the secondary electrons 16 over the input surface of the second microchannel plate 10. Alternatively, the potential difference may be stepped periodically or in an otherwise stepwise manner so as to switch, move or deflect the secondary electrons 16 between different areas, regions or portions of the input surface of the second microchannel plate 10.

According to a preferred embodiment the acceleration plate or electrode 30 is maintained at a potential which is more positive than the output surface of the first microchannel plate 8 and more positive that the input surface of the second 10 microchannel plate. The embodiment shown and described in relation to FIGS. 13A and 13B is particularly advantageous as the time spread in the arrival times of the secondary electrons 16 at the input surface of the second microchannel plate 10 is minimized. This results in minimal distortion of the final resolution of the ion detector 7.

In another embodiment the potential applied to the accelerator plate or electrode 30 is maintained preferably substantially constant with respect to the output surface of the first 8 microchannel plate and second microchannel plate 10, and the magnitude of the magnetic field is varied either continuously or periodically. In this embodiment the magnetic field may be varied so as to sweep the secondary electrons 16 over the input surface of the second microchannel plate 10 or, less preferably, to switch the secondary electrons 16 between different areas, regions or portions of the input surface of the second microchannel plate 10.

FIGS. 14A and 14B show a SIMION simulation of the trajectories of secondary electrons 16 in a further embodiment wherein two detectors 23,24 are arranged preferably substantially symmetrically about the first microchannel plate 8. The secondary electrons 16 emitted from the output of the first microchannel plate 8 are preferably accelerated using a grid electrode 32 arranged downstream of the first microchannel plate and which is preferably held at a constant positive potential with respect to the output surface of the first microchannel plate 8.

A magnetic field, preferably of substantially constant magnitude, is preferably arranged such as to be substantially parallel to the exit surface of the first microchannel plate 8 and the input surfaces of the detectors 23,24. FIG. 14A shows the trajectories of the secondary electrons 16 at a first time $t_1$ wherein the magnetic field is arranged in a first direction so as to guide the secondary electrons 16 onto the first detector 23. FIG. 14B shows the trajectories of the secondary electrons 16 at a second later time $t_2$ wherein the direction of the magnetic field has been reversed such that the secondary electrons 16 are guided onto the other detector 24. The cycle is then preferably repeated.

In a further embodiment, a detecting area comprising more than two detectors may be arranged circumferentially about the first microchannel plate 8. The detecting area may further preferably be substantially continuous. The direction of the magnetic field may preferably be varied substantially continuously or alternatively in a stepped periodical manner so as to sweep, switch or rotate the secondary electrons 16 onto different areas of the continuous detector or onto separate detectors.

It is also contemplated that in all the embodiments described above the first mircochannel plate 8 could be replaced by another type of device. For example, ions 12 could be arranged to be incident upon any material which will yield secondary electrons 16, such as, for example, Boron doped Chemical Vapor Deposition ("CVD") diamond films. Such films may be arranged to receive ions 12 and to generate secondary electrons in response thereto.

Although in the embodiments described above the area of the detector 9,23,24 onto which the secondary electrons 16 are guided has been described with reference to a microchannel plate it may in fact comprise any type of electron multiplier (for example, a photomultiplier tube or an electron-multiplier tube).

The ion detector of the preferred embodiment may be used in conjunction with mass spectrometers employing pseudo-continuous ion sources or pulsed ion sources such as Matrix Assisted Laser Desorption Ionisation ("MALDI") ion sources. The preferred embodiment is also applicable to mass spectrometers other than Time of Flight mass spectrometers, for example quadrupole, ion trap and magnetic sector mass spectrometers.

Although the present invention has been described with reference to preferred embodiments, it will be understood by those skilled in the art that various changes in form and detail may be made without departing from the scope of the invention as set forth in the accompanying claims.

What is claimed is:

1. A detector for use in a mass spectrometer, said detector comprising:

a microchannel plate, wherein in use particles are received at an input surface of said microchannel plate and electrons are released from an output surface of said microchannel plate, said output surface having a first area; and a detecting device having a detecting surface arranged to receive in use at least some of the electrons released from said microchannel plate, said detecting surface having a second area;

wherein said second area is substantially greater than said first area.

2. A detector as claimed in claim 1, wherein said second area is at least 5%, 10%, 15%, 20%, 25%, 30%, 35%, 40%, 45%, 50%, 55%, 60%, 65%, 70%, 75%, 80%, 85%, 90%, 95% or 100% greater than said first area.

3. A detector as claimed in claim 1, wherein said second area is at least 150%, 200%, 250%, 300%, 350%, 400%, 450% or 500% greater than said first area.

4. A detector for use in a mass spectrometer, said detector comprising:

a microchannel plate, wherein in use particles are received at an input surface of said microchannel plate and electrons are released from an output surface of said microchannel plate, wherein on average x electrons per unit area are released from said output surface; and a detecting device having a detecting surface arranged to receive in use at least some of the electrons generated by said microchannel plate, wherein on average y electrons per unit area are received on said detecting surface;

wherein $x>y$.

5. A detector as claimed in claim 4, wherein x is at least 5%, 10%, 15%, 20%, 25%, 30%, 35%, 40%, 45%, 50%, 55%, 60%, 65%, 70%, 75%, 80%, 85%, 90%, 95% or 100% greater than y.

6. A detector as claimed in claim 4, wherein x is at least 150%, 200%, 250%, 300%, 350%, 400%, 450% or 500% greater than said first area.

7. A detector as claimed in any claim 1, wherein said particles comprise ions.

8. A detector as claimed in any of claims 1, wherein said particles comprise photons or electrons.

9. A detector as claimed in claim 1, wherein in use electrons released from said output surface of said microchannel plate are released into a region having an electric field.

10. A detector as claimed in claim 9, further comprising one or more electrodes arranged such that an electric field is provided between said microchannel plate and said detecting device.

11. A detector as claimed in claim 10, wherein said one or more electrodes comprises one or more annular electrodes.

12. A detector as claimed in claim 10, wherein said one or more electrodes comprises one or more Einzel lens arrangements comprising three or more electrodes.

13. A detector as claimed in claim 10, wherein said one or more electrodes comprises one or more segmented rod sets.

14. A detector as claimed in claim 10, wherein said one or more electrodes comprises one or more tubular electrodes.

15. A detector as claimed in claim 10, wherein said one or more electrodes comprises one or more quadrupole, hexapole, octapole or higher order rod sets.

16. A detector as claimed in claim 10, wherein said one or more electrodes comprises a plurality of electrodes having apertures through which electrons are transmitted in use, said apertures having substantially the same area.

17. A detector as claimed in claim 10, wherein said one or more electrodes comprises a plurality of electrodes having apertures through which electrons are transmitted in use, said apertures becoming progressively smaller or larger in a direction towards said detecting device.

18. A detector as claimed in claim 1, wherein in use said output surface of said microchannel plate is maintained at a first potential and said detecting surface of said detecting device is maintained at a second potential.

19. A detector as claimed in claim 18, wherein said second potential is more positive than said first potential.

20. A detector as claimed in claim 19, wherein the potential difference between said surface of said detecting device and said output surface of said microchannel plate is selected from the group consisting of: (i) 0–50 V; (ii) 50–100 V; (iii) 100–150 V; (iv) 150–200 V; (v) 200–250 V; (vi) 250–300 V; (vii) 300–350 V; (viii) 350–400 V; (ix) 400–450 V; (x) 450–500 V; (xi) 500–550 V; (xii) 550–600 V; (xiii) 600–650 V; (xiv) 650–700 V; (xv) 700–750 V; (xvi) 750–800 V; (xvii) 800–850 V; (xviii) 850–900 V; (xix) 900–950 V; (xx) 950–1000 V; (xxi) 1.0–1.5 kV; (xxii) 1.5–2.0 kV; (xxiii) 2.0–2.5 kV; (xxiv) >2.5 kV; and (xxv) <10 kV.

21. A detector as claimed in claim 9, wherein in use said output surface of said microchannel plate is maintained at a first potential, said detecting surface of said detecting device is maintained at a second potential and one or more electrodes disposed between said microchannel plate and said detecting surface are maintained at a third potential.

22. A detector as claimed in claim 21, wherein in use one or more electrodes disposed between said microchannel plate and said detecting surface are maintained at a fourth potential.

23. A detector as claimed in claim 22, wherein in use one or more electrodes disposed between said microchannel plate and said detecting surface are maintained at a fifth potential.

24. A detector as claimed in claim 23, wherein said third and/or fourth and/or fifth potential is substantially equal to said first and/or second potential.

25. A detector as claimed in claim 23, wherein said third and/or fourth and/or fifth potential is more positive than said first and/or second potential.

26. A detector as claimed in claim 23, wherein said third and/or fourth and/or fifth potential is more negative than said first and/or second potential.

27. A detector as claimed in claim 23, wherein the potential difference between said third and/or fourth and/or fifth potential and said first and/or said second potential is selected from the group consisting of: (i) 0–50 V; (ii) 50–100 V; (iii) 100–150 V; (iv) 150–200 V; (v) 200–250 V; (vi) 250–300 V; (vii) 300–350 V; (viii) 350–400 V; (ix) 400–450 V; (x) 450–500 V; (xi) 500–550 V; (xii) 550–600 V; (xiii) 600–650 V; (xiv) 650–700 V; (xv) 700–750 V; (xvi) 750–800 V; (xvii) 800–850 V; (xviii) 850–900 V; (xix) 900–950 V; (xx) 950–1000 V; (xxi) 1.0–1.5 kV; (xxii) 1.5–2.0 kV; (xxiii) 2.0–2.5 kV; (xxiv) >2.5 kV; and (xxv) <10 kV.

28. A detector as claimed in claim 23, wherein said third and/or fourth and/or fifth potential is intermediate said first and/or said second potentials.

29. A detector as claimed in claim 1, further comprising a grid electrode arranged between said microchannel plate and said detecting device.

30. A detector as claimed in claim 29, wherein said grid electrode is substantially hemispherical or otherwise non-planar.

31. A detector as claimed in claim 1, wherein said detecting device comprises a single detecting region.

32. A detector as claimed in claim 31, wherein said single detecting region comprises: (i) an electron multiplier; (ii) a scintillator; or (iii) a photo-multiplier tube.

33. A detector as claimed in claim 32, wherein said single detecting region comprises one or more microchannel plates.

34. A detector as claimed in claim 33, wherein said one or more microchannel plates receives in use over a first number of channels at least some electrons released from a second number of channels of said microchannel plate arranged upstream of said detecting device, wherein said first number of channels is substantially greater than said second number of channels.

35. A detector as claimed in claim 1, wherein said detecting device comprises a first detecting region and at least a second separate detecting region.

36. A detector as claimed in claim 35, wherein said second detecting region is spaced apart from said first detecting region.

37. A detector as claimed in claim 35, wherein said first and second detecting regions have substantially equal detecting areas.

38. A detector as claimed in claim 35, wherein said first and second detecting regions have substantially different detecting areas.

39. A detector as claimed in claim 38, wherein the area of said first detecting region is greater than the area of said second detecting region by a percentage p, wherein p is selected from the group consisting of: (i) <10%; (ii) 10–20%; (iii) 20–30%; (iv) 30–40%; (v) 40–50%; (vi) 50–60%; (vii) 60–70%; (viii) 70–80%; (xi) 80–90%; and (x) >90%.

40. A detector as claimed in claim 35, wherein in use the number of electrons received by said first detecting area is greater than the number of electrons received by said second detecting area by a percentage q, wherein q is selected from the group consisting of: (i) <10%; (ii) 10–20%; (iii) 20–30%; (iv) 30–40%; (v) 40–50%; (vi) 50–60%; (vii) 60–70%; (viii) 70–80%; (xi) 80–90%; and (x) >90%.

41. A detector as claimed in claim 35, further comprising at least one electrode arranged so that in use at least some electrons released from said microchannel plate are guided to said first detecting region and/or at least some electrons released from said microchannel plate are guided to said second detecting region.

42. A detector as claimed in claim 35, wherein said first detecting region comprises: (i) one or more microchannel plates; (ii) an electron multiplier; (iii) a scintillator; or (iv) a photo-multiplier tube.

43. A detector as claimed in claim 35, wherein said second detecting region comprises: (i) one or more microchannel plates; (ii) an electron multiplier; (iii) a scintillator; or (iv) a photo-multiplier tube.

44. A detector as claimed in claim 1, wherein said detecting device comprises at least one chevron pair of microchannel plates.

45. A detector as claimed in claim 1, further comprising at least one collector plate arranged to receive in use at least some electrons generated and released by said detecting device.

46. A detector as claimed in claim 45, wherein said at least one collector plate is shaped to at least partially compensate for a temporal spread in the flight time of electrons incident on said detecting device.

47. A detector as claimed in claim 1, wherein said detecting device is shaped to at least partially compensate for a temporal spread in the flight time of electrons incident on said detecting device.

48. A detector as claimed in claim 1, further comprising one or more electrodes arranged so as to at least partially compensate for a temporal spread in the flight time of electrons incident on said detecting device.

49. A detector for use in a mass spectrometer, said detector comprising:

a microchannel plate, wherein in use particles are received at an input surface of said microchannel plate and electrons are released from an output surface of said microchannel plate, said output surface having a first area;

a detecting device having a detecting surface having a second area;

a first device arranged between said microchannel plate and said detecting device, said first device being arranged to receive at least some of said electrons released from said output surface of said microchannel plate and to generate photons; and a second device arranged between said first device and said detecting device, said second device arranged to receive at least some of said photons generated by said first device and to release electrons;

wherein said detecting surface is arranged to receive at least some of the electrons generated by said second device; and wherein said second area is substantially greater than said first area.

50. A detector as claimed in claim 49, wherein said second area is at least 5%, 10%, 15%, 20%, 25%, 30%, 35%, 40%, 45%, 50%, 55%, 60%, 65%, 70%, 75%, 80%, 85%, 90%, 95% or 100% greater than said first area.

51. A detector as claimed in claim 49, wherein said second area is at least 150%, 200%, 250%, 300%, 350%, 400%, 450% or 500% greater than said first area.

52. A detector for use in a mass spectrometer, said detector comprising:

a microchannel plate, wherein in use particles are received at an input surface of said microchannel plate and electrons are released from an output surface of said microchannel plate, wherein on average x electrons per unit area are released from said output surface;

a detecting device having a detecting surface having a second area;

a first device arranged between said microchannel plate and said detecting device, said first device being arranged to receive at least some of said electrons released from said output surface and to generate photons; and a second device arranged between said first device and said detecting device, said second device arranged to receive at least some of said photons generated by said first device and to release electrons;

wherein said detecting surface is arranged to receive at least some of the electrons generated by said second device, said detecting surface receiving on average y electrons per unit area; and wherein x>y.

53. A detector as claimed in claim 52, wherein x is at least 5%, 10%, 15%, 20%, 25%, 30%, 35%, 40%, 45%, 50%, 55%, 60%, 65%, 70%, 75%, 80%, 85%, 90%, 95% or 100% greater than y.

54. A detector as claimed in claim 52, wherein x is at least 150%, 200%, 250%, 300%, 350%, 400%, 450% or 500% greater than y.

55. A detector for use in a mass spectrometer, said detector comprising:

a microchannel plate, wherein in use particles are received at an input surface of said microchannel plate and electrons are released from an output surface of said microchannel plate, said output surface having a first area;

a detecting device having a detecting surface having a second area; and a first device arranged between said microchannel plate and said detecting device, said first device being arranged to receive at least some of said electrons released from said output surface of said microchannel plate and to generate photons;

wherein said detecting surface is arranged to receive at least some of said photons generated by said first device; and wherein said second area is substantially greater than said first area.

56. A detector as claimed in claim 55, wherein said second area is at least 5%, 10%, 15%, 20%, 25%, 30%, 35%, 40%, 45%, 50%, 55%, 60%, 65%, 70%, 75%, 80%, 85%, 90%, 95% or 100% greater than said first area.

57. A detector as claimed in claim 55, wherein said second area is at least 150%, 200%, 250%, 300%, 350%, 400%, 450% or 500% greater than said first area.

58. A detector for use in a mass spectrometer, said detector comprising:

a microchannel plate, wherein in use particles are received at an input surface of said microchannel plate and electrons are released from an output surface of said microchannel plate, wherein on average x electrons per unit area are released from said output surface;

a detecting device; and a first device arranged between said microchannel plate and said detecting device, said first device arranged to receive at least some of said electrons released from said output surface of said microchannel plate and to generate photons;

wherein said detecting device is arranged to receive at least some of the photons generated by said first device, said detecting device receiving on average z photons per unit area; and wherein x>z.

59. A detector as claimed in claim 58, wherein x is at least 5%, 10%, 15%, 20%, 25%, 30%, 35%, 40%, 45%, 50%, 55%, 60%, 65%, 70%, 75%, 80%, 85%, 90%, 95% or 100% greater than z.

60. A detector as claimed in claim 58, wherein x is at least 150%, 200%, 250%, 300%, 350%, 400%, 450% or 500% greater than z.

61. A detector as claimed in claim 55, wherein said photons are UV photons.

62. A mass spectrometer comprising a detector as claimed in claim 1.

63. A mass spectrometer as claimed in claim 62, wherein said detector forms part of a Time of Flight mass analyser.

64. A mass spectrometer as claimed in claim 62, further comprising an Analogue to Digital Converter ("ADC") connected to said detector.

65. A mass spectrometer as claimed in claim 62, further comprising a Time to Digital Converter ("TDC") connected to said detector.

66. A mass spectrometer as claimed in claim 62, further comprising an ion source selected from the group consisting of: (i) an Electrospray Ionisation ("ESI") ion source; (ii) an Atmospheric Pressure Ionisation ("API") ion source; (iii) an Atmospheric Pressure Chemical Ionisation ("APCI") ion source; (iv) an Atmospheric Pressure Photo Ionisation ("APPI") ion source; (v) a Laser Desorption Ionisation ("LDI") ion source; (vi) an Inductively Coupled Plasma ("ICP") ion source; (vii) a Fast Atom Bombardment ("FAB") ion source; (viii) a Liquid Secondary Ion Mass Spectrometry ("LSIMS") ion source; (ix) a Field Ionisation ("FI") ion source; (x) a Field Desorption ("FD") ion source; (xi) an Electron Impact ("EI") ion source; (xii) a Chemical Ionisation ("CI") ion source; and (xiii) a Matrix Assisted Laser Desorption Ionisation ("MALDI") ion source.

67. A mass spectrometer as claimed in claim 66, wherein said ion source is continuous or pulsed.

68. A method of detecting particles comprising:

receiving particles at an input surface of a microchannel plate;

releasing electrons from an output surface of said microchannel plate, said output surface having a first area; and receiving at least some of said electrons on a detecting surface of a detecting device, said detecting surface having a second area;

wherein said second area is substantially greater than said first area.

69. A method as claimed in claim 68, wherein said second area is at least 5%, 10%, 15%, 20%, 25%, 30%, 35%, 40%, 45%, 50%, 55%, 60%, 65%, 70%, 75%, 80%, 85%, 90%, 95% or 100% greater than said first area.

70. A method as claimed in claim 68, wherein said second area is at least 150%, 200%, 250%, 300%, 350%, 400%, 450% or 500% greater than said first area.

71. A method of detecting particles comprising:

receiving particles at an input surface of a microchannel plate;

releasing on average x electrons per unit area from an output surface of said microchannel plate;

receiving at least some of said electrons on a detecting surface of a detecting device, wherein said detecting surface receives on average y electrons per unit area;

wherein x>y.

72. A method as claimed in claim 71, wherein x is at least 5%, 10%, 15%, 20%, 25%, 30%, 35%, 40%, 45%, 50%, 55%, 60%, 65%, 70%, 75%, 80%, 85%, 90%, 95% or 100% greater than y.

73. A method as claimed in claim 71, wherein x is at least 150%, 200%, 250%, 300%, 350%, 400%, 450% or 500% greater than y.

74. A method of detecting particles comprising:

receiving particles at an input surface of a microchannel plate;

releasing electrons from an output surface of said microchannel plate, said output surface having a first area;

receiving at least some of said electrons on a first device, said first device generating photons in response thereto;

receiving at least some of said photons on a second device, said second device generating and releasing electrons in response thereto; and receiving at least some of the electrons generated by said second device on a detecting device having a detecting surface having a second area;

wherein said second area is greater than said first area.

75. A method as claimed in claim 74, wherein said second area is at least 5%, 10%, 15%, 20%, 25%, 30%, 35%, 40%, 45%, 50%, 55%, 60%, 65%, 70%, 75%, 80%, 85%, 90%, 95% or 100% greater than said first area.

76. A method as claimed in claim 74, wherein said second area is at least 150%, 200%, 250%, 300%, 350%, 400%, 450% or 500% greater than said first area.

77. A method of detecting particles comprising;

receiving particles at an input surface of a microchannel plate;

releasing on average x electrons per unit area from an output surface of said microchannel plate;

receiving at least some of said electrons on a first device, said first device generating photons in response thereto;

receiving at least some of said photons on a second device, said second device generating and releasing electrons in response thereto; and receiving at least some of the electrons generated by said second device on a detecting surface of a detecting device, said detecting surface receiving on average y electrons per unit area;

wherein x>y.

78. A method as claimed in claim 77, wherein x is at least 5%, 10%, 15%, 20%, 25%, 30%, 35%, 40%, 45%, 50%, 55%, 60%, 65%, 70%, 75%, 80%, 85%, 90%, 95% or 100% greater than y.

79. A method as claimed in claim 77, wherein x is at least 150%, 200%, 250%, 300%, 350%, 400%, 450% or 500% greater than y.

80. A method of detecting particles comprising;

receiving particles at an input surface of a microchannel plate;

releasing electrons from an output surface of said microchannel plate, said output surface having a first area;

receiving at least some of said electrons on a device, said device generating photons in response thereto;

receiving at least some of said photons generated by said device on a detecting surface of a detecting device having a second area;

wherein said second area is substantially greater than said first area.

81. A method as claimed in claim 80, wherein said second area is at least 5%, 10%, 15%, 20%, 25%, 30%, 35%, 40%, 45%, 50%, 55%, 60%, 65%, 70%, 75%, 80%, 85%, 90%, 95% or 100% greater than said first area.

82. A method as claimed in claim 80, wherein said second area is at least 150%, 200%, 250%, 300%, 350%, 400%, 450% or 500% greater than said first area.

83. A method of detecting particles comprising;

receiving particles at an input surface of a microchannel plate;

releasing on average x electrons per unit area from an output surface of said microchannel plate;

receiving at least some of said electrons on a device, said device generating photons in response thereto;

receiving at least some of the photons generated by said device on a detecting surface of a detecting device, said detecting surface receiving on average z photons per unit area;

wherein x>z.

84. A method as claimed in claim 83, wherein x is at least 5%, 10%, 15%, 20%, 25%, 30%, 35%, 40%, 45%, 50%, 55%, 60%, 65%, 70%, 75%, 80%, 85%, 90%, 95% or 100% greater than z.

85. A method as claimed in claim 83, wherein x is at least 150%, 200%, 250%, 300%, 350%, 400%, 450% or 500% greater than z.

86. A method of mass spectrometry comprising a method of detecting particles as claimed in claim 68.

* * * * *